US011617083B2

(12) United States Patent
Kim et al.

(10) Patent No.: US 11,617,083 B2
(45) Date of Patent: Mar. 28, 2023

(54) APPARATUS AND METHOD FOR MANAGING INTERFERENCE IN WIRELESS COMMUNICATION SYSTEM

(71) Applicant: Samsung Electronics Co., Ltd., Suwon-si (KR)

(72) Inventors: Byunggook Kim, Suwon-si (KR); Okyoung Choi, Suwon-si (KR); Sungnam Hong, Suwon-si (KR); Hojoong Kwon, Suwon-si (KR); Myungkwang Byun, Suwon-si (KR); Jiyun Seol, Suwon-si (KR); Kiseob Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 16/868,999

(22) Filed: May 7, 2020

(65) Prior Publication Data

US 2020/0359223 A1  Nov. 12, 2020

(30) Foreign Application Priority Data

May 7, 2019 (KR) .......................... 10-2019-0053349

(51) Int. Cl.
*H04W 12/12* (2021.01)
*H04W 12/122* (2021.01)
(Continued)

(52) U.S. Cl.
CPC ......... *H04W 12/122* (2021.01); *H04L 5/0051* (2013.01); *H04L 5/1469* (2013.01);
(Continued)

(58) Field of Classification Search
CPC .............. H04W 12/122; H04W 24/10; H04W 72/042; H04W 72/0446; H04L 5/0051; H04L 5/1469
See application file for complete search history.

(56) References Cited

U.S. PATENT DOCUMENTS

| 8,958,319 B2 | 2/2015 | Behravan et al. |
| 9,729,260 B2 | 8/2017 | Zhu et al. |
| (Continued) | | |

FOREIGN PATENT DOCUMENTS

| CN | 106535250 A | 3/2017 |
| EP | 2 869 616 A1 | 5/2015 |
| (Continued) | | |

OTHER PUBLICATIONS

International Search Report dated Aug. 20, 2020, issued in International Application No. PCT/KR2020/006031.

(Continued)

*Primary Examiner* — Khaled M Kassim
*Assistant Examiner* — Zhaohui Yang
(74) *Attorney, Agent, or Firm* — Jefferson IP Law, LLP

(57) ABSTRACT

The disclosure relates to a pre-5th-generation (5G) or 5G communication system to be provided for supporting higher data rates beyond 4th-generation (4G) communication system, such as long term evolution (LTE). A method for operating a management device in a wireless communication system is provided. The method includes obtaining measurement results of a plurality of cells respectively, identifying an aggressor cell and a victim cell by atmospheric interference among the plurality of cells, based on the measurement results, and performing interference control on at least one of the aggressor cell or the victim cell, wherein the measurement results include interference information related to a downlink signal of at least one other cell (Continued)

measured in an uplink resource duration of a measurement cell and cell information of the at least one other cell.

18 Claims, 13 Drawing Sheets

(51) Int. Cl.
    *H04W 24/10*     (2009.01)
    *H04L 5/14*     (2006.01)
    *H04W 72/0446*     (2023.01)
    *H04W 72/04*     (2023.01)
    *H04L 5/00*     (2006.01)

(52) U.S. Cl.
    CPC ......... *H04W 24/10* (2013.01); *H04W 72/042* (2013.01); *H04W 72/0446* (2013.01)

(56) References Cited

U.S. PATENT DOCUMENTS

| | | | |
|---|---|---|---|
| 2013/0286902 A1* | 10/2013 | Chen ................ | H04L 27/2602 370/280 |
| 2014/0056190 A1 | 2/2014 | Qian et al. | |
| 2014/0233457 A1 | 8/2014 | Koutsimanis et al. | |
| 2015/0333877 A1 | 11/2015 | Rahman et al. | |
| 2017/0294976 A1 | 10/2017 | Hahn et al. | |
| 2020/0100116 A1* | 3/2020 | Chakraborty ..... | H04W 74/0808 |
| 2022/0109536 A1* | 4/2022 | Ghozlan ............... | H04L 5/0048 |

FOREIGN PATENT DOCUMENTS

| | | | | |
|---|---|---|---|---|
| JP | 2019-506106 A | 2/2019 | | |
| KR | 10-2013-0081296 A | 7/2013 | | |
| WO | WO-2012148336 A1 * | 11/2012 | ........... | H04B 7/2656 |
| WO | WO-2013141770 A1 * | 9/2013 | ........... | H04L 5/1469 |
| WO | 2016/192590 A1 | 12/2016 | | |
| WO | WO-2019062501 A1 * | 4/2019 | ........... | H04L 5/0044 |

OTHER PUBLICATIONS

Extended European Search Report dated Jun. 9, 2022, issued in a counterpart European Application No. 20802474.5.
3GPP TR 38.866 V16.1.0; 3rd Generation Partnership Project; Technical Specification Group Radio Access Network; Study on remote interference management for NR (Release 16), Mar. 25, 2019.

* cited by examiner

APPARATUS AND METHOD FOR MANAGING INTERFERENCE IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0053349, filed on May 7, 2019, in the Korean Intellectual Property Office, the disclosure of which is incorporated by reference herein in its entirety.

BACKGROUND

1. Field

The disclosure relates to a wireless communication system. More particularly, the disclosure relates to an apparatus and a method for managing interference in the wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'beyond 4G Network' or a 'post long term evolution (LTE) system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A signal transmitted from a distant cell is transmitted for a long time, it may be received in an uplink resource duration of at least one other cell. Since the received signal interferes with the corresponding cell, uplink communication quality may be degraded.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure to provide an apparatus and a method for effectively controlling inter-cell interference in a wireless communication system.

Another aspect of the disclosure is to provide an apparatus and a method for identifying an aggressor cell and a victim cell in a wireless communication system.

Another aspect of the disclosure is to provide an apparatus and a method for controlling interference of an aggressor cell in a wireless communication system.

Another aspect of the disclosure is to provide an apparatus and a method for interference avoidance of a victim cell in a wireless communication system.

Another aspect of the disclosure is to provide an apparatus and a method for controlling inter-cell interference based on an interference aspect in a wireless communication system.

Another aspect of the disclosure is to provide an apparatus and a method for controlling inter-cell interference based on a cell distance in a wireless communication system.

Another aspect of the disclosure is to provide an apparatus and a method for adjusting a guard period according to interference from another cell in a wireless communication system.

Additional aspects will be set forth in part in the description which follows and, in part, will be apparent from the description, or may be learned by practice of the presented embodiments.

In accordance with an aspect of the disclosure, a method for operating a management device in a wireless communication system is provided. The method includes obtaining measurement results of a plurality of cells respectively, identifying an aggressor cell and a victim cell by atmospheric interference among the plurality of the cells, based on the measurement results, and performing interference control on at least one of the aggressor cell and the victim cell, wherein the measurement results include interference information related to a downlink signal of at least one other cell measured in an uplink resource duration of a measurement cell and cell information of the at least one other cell.

In accordance with another aspect of the disclosure, a management device in a wireless communication system is provided. The management device includes at least one transceiver and at least one processor, wherein the at least one processor is configured to obtain measurement results of a plurality of cells respectively, identify an aggressor cell and a victim cell by atmospheric interference among the plurality of the cells, based on the measurement results, and perform interference control on at least one of the aggressor cell and the victim cell, wherein the measurement results include interference information related to a downlink signal of at least one other cell measured in an uplink resource duration of a measurement cell and cell information of the at least one other cell.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

DETAILED DESCRIPTION

Figure 1:
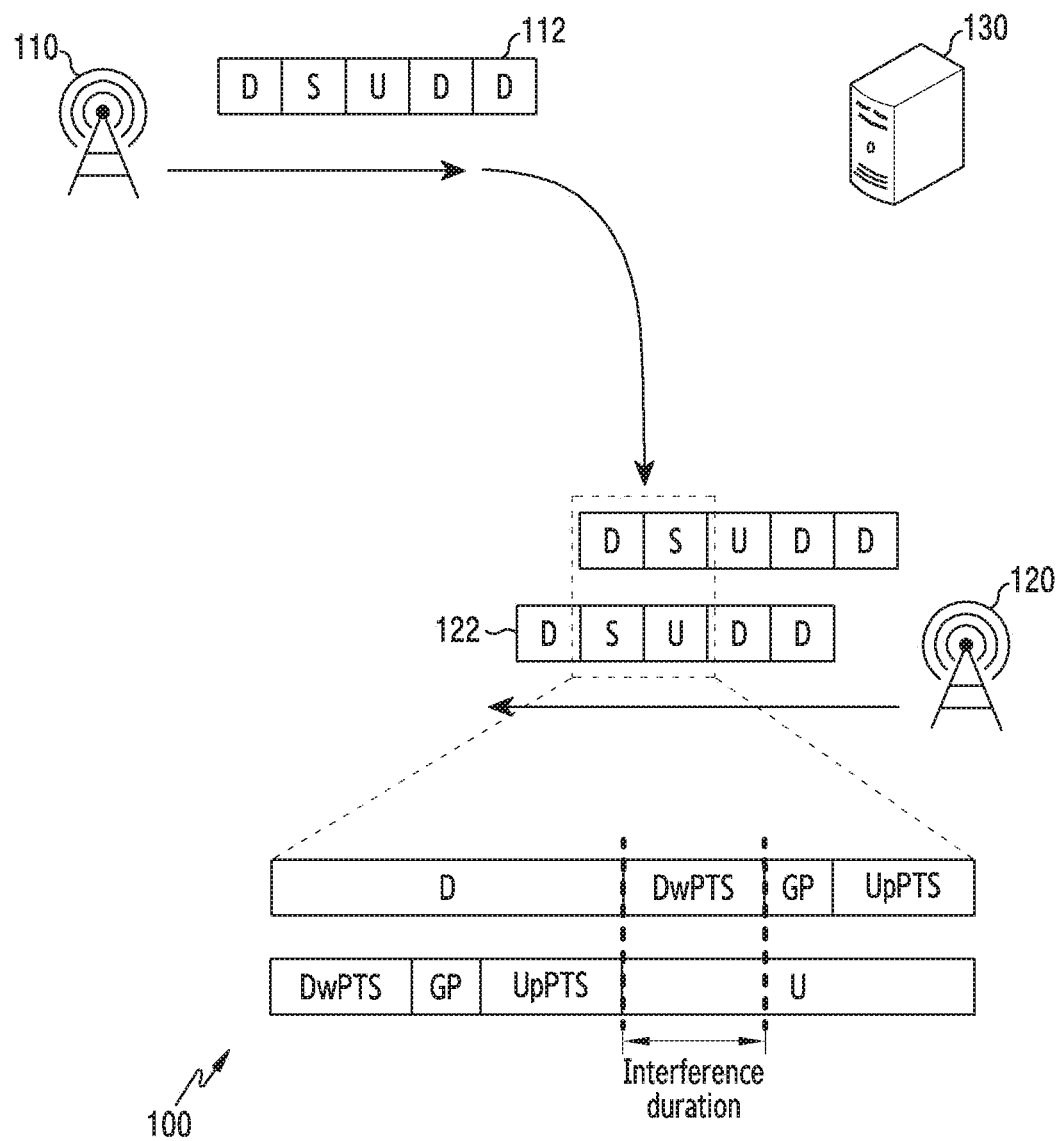
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments to be described below, a hardware approach may be described as an example. However, it is understood that various embodiments may include a technology using both hardware and software, and various embodiments do not exclude a software-based approach.

Various embodiments provide an apparatus and a method for controlling inter-cell interference in a wireless communication system. More specifically, the disclosure describes a technique for measuring interference of a downlink signal on an uplink resource duration due to propagation delay, and controlling the interference per cell in the wireless communication system.

Terms (e.g., information, a value, a command) indicating control information, terms (e.g., an operation, a procedure) indicating operation states, terms (e.g., a signal, a sequence, a symbol, information) indicating signals, terms indicating data, terms (e.g., a base station, digital unit (DU), a radio unit (RU), an element management system (EMS), an access unit (AU), a centralized unit (CU), a long term evolution (LTE) management server (LMS), a management device) indicating network entities, terms (e.g., a signal, a command, data, triggering, notification) indicating messages, and terms indicating components of a device, which are used in the following descriptions, are for the sake of explanations. Accordingly, the disclosure is not limited to the terms to be described, and may use other terms having technically identical or similar meaning.

In this disclosure, to determine whether a specific condition is satisfied or fulfilled, expressions, such as "greater than" or "less than" are used by way of example and expressions, such as "greater than or equal to" or "less than or equal to" are also applicable and not excluded. For example, a condition defined with "greater than or equal to" may be replaced by "greater than" (or vice-versa), a condition defined with "less than or equal to" may be replaced by "less than" (or vice-versa), etc.

The disclosure provides various embodiments using terms used in some communication standards (e.g., 3rd generation partnership project (3GPP)) by way of example. Various embodiments of the disclosure may be easily used in other communication systems.

FIG. 1 illustrates a wireless communication system according to an embodiment of the disclosure.

Referring to FIG. 1, the wireless communication system includes a base station 110, a base station 120, and a management device 130. While FIG. 1 illustrates the base station 110 and the base station 120 as some of nodes which use a radio channel in the wireless communication system, other base stations may be further included.

The base station 110 and the base station 120 are a network infrastructure which provides radio access to terminals. The base station 110 and the base station 120 have coverage defined as a geographical area, based on a signal transmission distance. The base station 110 and the base station 120 may be referred to as an access point (AP), an eNodeB (eNB), a 5th generation node (5G node), a next generation nodeB (gNB), a wireless point, a transmission/reception point (TRP), or other term having a technically equivalent meaning. In some cases, a cell may indicate a communication area provided from the base station. One base station may cover one cell, or multiple cells. Herein, the multiple cells may be distinguished by their supporting frequency or their covering sector. In the following, the base station may embrace the cell, and the cell may embrace the base station.

The management device 130 controls a plurality of base stations (or cells) including the base station 110 and the base station 120. For example, the management device 130 may control inter-cell interference. According to various embodiments of the disclosure, the management device 130 may control to identify an aggressor cell, and control the aggressor cell, a victim cell, a detected cell, or terminals to avoid the interference. According to an embodiment of the disclosure, the management device 130 may be positioned in a base station. According to an embodiment of the disclosure, the management device 130 may be a separate network entity from the base station.

A time duplex division (TDD) communication system supports downlink communication and uplink communication between the base station and the terminal using different time resources. Since propagation delay occurs in signal transmission over a radio channel, a downlink signal of the cell may be received in a time resource for uplink of at least one other cell. Accordingly, what is needed is a method for providing good communication quality, by measuring the inter-cell interference caused by the propagation delay and controlling corresponding interference.

Before describing the inter-cell interference of the disclosure, a resource structure of the TDD communication system is explained. In some embodiments of the disclosure, the base station and the terminal may use the TDD communication system of LTE. The TDD communication system of the LTE defines time resources for the downlink communication and time resources for the uplink communication in one radio frame. The radio frame may include uplink (UL) subframes for the UL transmission and downlink (DL) subframes for the DL transmission. The frame may include a special subframe (SSF) for switching from the DL transmission to the UL transmission. Herein, a combination of the UL subframe, the DL subframe, and the SSF in one frame is referred to as a UL/DL configuration. Another UL/DL configuration indicates another combination of the UL subframe, the DL subframe, and the SSF in one frame. For example, a UL/DL configuration #2 may include six DL frames, two UL subframes, and two SSFs, and a UL/DL configuration #5 may include eight DL frames, one UL subframe, and one SSF. In some embodiments of the disclosure, the wireless communication environment 100 may support the LTE-TDD communication system. The UL/DL configuration may be operated as shown in Table 1. In Table 1, D denotes the DL subframe, S denotes the SSF, and U denotes the UL subframe.

TABLE 1

| UL/DL config- | subframe number | | | | | | | | | | Number of each subframe | | |
|---|---|---|---|---|---|---|---|---|---|---|---|---|---|
| uration | 0 | 1 | 2 | 3 | 4 | 5 | 6 | 7 | 8 | 9 | DL | UL | S |
| 0 | D | S | U | U | U | D | S | U | U | U | 2 | 6 | 2 |
| 1 | D | S | U | U | D | D | S | U | U | D | 4 | 4 | 2 |
| 2 | D | S | U | D | D | D | S | U | D | D | 6 | 2 | 2 |
| 3 | D | S | U | U | U | D | D | D | D | D | 6 | 3 | 1 |
| 4 | D | S | U | U | D | D | D | D | D | D | 7 | 2 | 1 |
| 5 | D | S | U | D | D | D | D | D | D | D | 8 | 1 | 1 |
| 6 | D | S | U | U | U | D | S | U | U | D | 3 | 5 | 2 |

The SSF may include a downlink pilot time slot (DwPTS), a guard period (GP), and an uplink pilot time slot (UpPTS). The DwPTS is a DL resource duration in the SSF and may be used for transmission of a physical downlink shared channel (PDSCH). The UpPTS is a UL resource duration in the SSF and may be used for transmission of a sounding reference signal (SRS) or a physical random access channel (PRACH). The GP has none of DL transmission and the UL transmission, and may be required for switching between the DL and the UL. The GP may be interposed between the DwPTS and the UpPTS in one SSF (e.g., 1 ms). Herein, the combination of the DwPTS, the GP, and the UpPTS in one SSF is referred to as an SSF configuration. Another SSF configuration may indicate another combination of a DwPTS length, a GP length, and a UpPTS length in one SSF. If the wireless communication environment 100 supports the LTE-TDD communication system, the SSF configuration may be operated as shown in Table 2. For example, an SSF configuration #5 may indicate a combination in which the DwPTS occupies three symbols, the GP occupies nine symbols, and the UpPTS occupies two symbols, and an SSF configuration #7 may indicate a combination in which the DwPTS occupies ten symbols, the GP occupies two symbols, and the UpPTS occupies two symbols.

TABLE 2

| SSF config- | symbol number | | | | | | | | | | | | |
|---|---|---|---|---|---|---|---|---|---|---|---|---|---|
| uration | 0 | 1 | 2 | 3 | 4 | 5 | 6 | 7 | 8 9 10 | | 11 | 12 | 13 |
| 0 | Dw | | | | | | | GP | | | | | Up |
| 1 | | | Dw | | | | | | | | GP | | Up |
| 2 | | | Dw | | | | | | | | GP | | Up |
| 3 | | | | Dw | | | | | | | | GP | Up |
| 4 | | | | | Dw | | | | | | | GP | Up |
| 5 | Dw | | | | | | | GP | | | | | Up |
| 6 | | | Dw | | | | | | | | GP | | Up |
| 7 | | | Dw | | | | | | | | GP | | Up |
| 8 | | | | Dw | | | | | | | | GP | Up |
| 9 | | | Dw | | | | | GP | | | | | Up |

In some embodiments of the disclosure, the base station and the terminal may use the TDD communication system of the NR. The TDD communication system of the NR may be configured more flexibly than the LTE TDD communication system. The TDD communication system of the NR defines a DL-UL pattern indicating a relation of DL time resources for the DL communication and UL time resources for the UL communication. The DL-UL pattern may include periodicity, a DL time duration, and a UL time duration. The periodicity may indicate time adopting one DL-UL pattern. For example, the periodicity may be one of 0.5 ms, 0.625 ms, 1 ms, 1.25 ms, 2.5 ms, 3 ms, 4 ms, 5 ms, and 10 m. The DL time duration may be the time resource of the DL communication. The DL time duration may be expressed with the number of slots, the number of slots and symbols, or the number of symbols. The DL time duration may be located at a beginning part in one periodicity. The UL time duration may be the time resource of the uplink. The UL time duration may be expressed with the number of slots, the number of slots and symbols, or the number of symbols. The UL time duration may be located at an end part in one periodicity. Other slots than a DL slot (a slot where all symbols are DL symbols) and a UL slot (a slot where all symbols are UL symbols) in one periodicity may be flexible slots.

As an example of the resource structure of the NR TDD, if a subcarrier spacing (SCS) is 15 kHz, five slots may be defined in the periodicity of 5 ms. In the five slots, two slots at the front may be DL slots, two slots at the back may be UL slots, and the slot in the middle may include both of the UL symbol land the DL symbol. Among the 14 symbols of the remaining slot, the first five symbols may be DL symbols, the last three symbols may be UL symbols, and the remaining six symbols may be flexible symbols.

It is necessary to distinguish the DL time duration and the UL time duration, because the TDD communication system uses the same carrier frequency in the UL transmission and the DL transmission. Hence, the resource structures for the TDD communication system may include the DL time duration, the UL time duration, and the remaining duration between the DL time duration and the UL time duration. Meanwhile, inter-cell interference may be caused by propagation delay due to such time distinction. For example, the base station 110 in the LTE communication system may transmit or receive signals according to frames 112. The base station 120 may transmit or receive signals according to frames 122. In the frames 112 or the frames 122, D denotes a DL subframe, slot, or symbol, S denotes an SSF, a slot or a flexible symbol, and U denotes an UL subframe, slot, or symbol. In some cases, a signal transmitted from the base station 110 may cause interference on the base station 120. For example, if an atmospheric duct occurs in the TD system of FIG. 1, even if the base station 110 and the base station 120 are away from each other tens of kms through hundreds of kms, the signal transmitted from the base station 110 may cause strong interference at the base station 120. For example, if a DL signal transmitted in the DwPTS of the SSF of the base station 110 passes through the propagation delay and then is received at the base station 120 on the UL subframe of the base station 120, this signal may cause interference on the UL signal received at the base station 120. Since the distance between the base stations may cause the interference even in hundreds of kms, the atmospheric duct may be problematic even between counties using different frequency bands.

As above, as a DL signal of a particular cell is transmitted for a long time, the DL signal may be received in the UL resource duration of the cell distant from the particular cell. In other words, the base station and the terminal distant from each other in the cell may be interfered by the particular cell. Due to the propagation delay of the distant cell, the interference on the UL time duration may be referred to as distant cell interference, time-of-flight (TOF) interference, atmospheric duct interference, atmospheric interference, propagation delay interference, or distant interference. Hereinafter, the disclosure describes this interference as the atmospheric interference. In addition, the particular cell which causes the interference may be referred to as an aggressor, an aggressor base station, an aggressor cell, an interferer, an interferer base station, or an interference cell. The interfered cell may be referred to as a victim, a victim base station, a victim cell, a prey, a prey cell, a detector, or a detector base station. For example, the base station 110 may be the aggressor cell, and the base station 120 may be the victim cell. Herein, the concepts of the aggressor, the interferer, the victim, and the detector are relative, and a cell may be both the aggressor cell and the victim cell.

If a DL signal of at least one other cell comes into a UL time duration, a UL signal transmitted with relatively low output may be vulnerable to the atmospheric interference due to the DL signal. As a result, the victim cell may not detect the UL signal. To address this problem caused by the interference, what is needed is a method for identifying the aggressor cell (e.g., the cell of the base station 110) in relation to the interfered victim cell (e.g., the cell of the base station 120), and avoiding or reducing the interference of the aggressor cell at the victim cell. However, if the interference signal is received from tens or hundreds of kms, there are too many aggressor candidates and it is not easy to specify a possible aggressor cell. In addition, there may be multiple aggressor cells. Thus, the disclosure provides various embodiments for identifying the aggressor cell and reducing or avoiding the interference.

In the interference of FIG. 1, the atmospheric interference is caused by receiving the signal transmitted in the DwPTS of the SSF, in the UpPTS of the SSF or the following UL subframe. The concepts of the DwPTS and the UpPTS are used in the LTE or LTE-advanced (LTE-A) system, definitions of various embodiments for the similar interference relation and interference control may be applied to the resource structure (e.g., the DL-UL pattern, the periodicity, the flexible slot, the flexible symbols) of the NR system.

Figure 2:
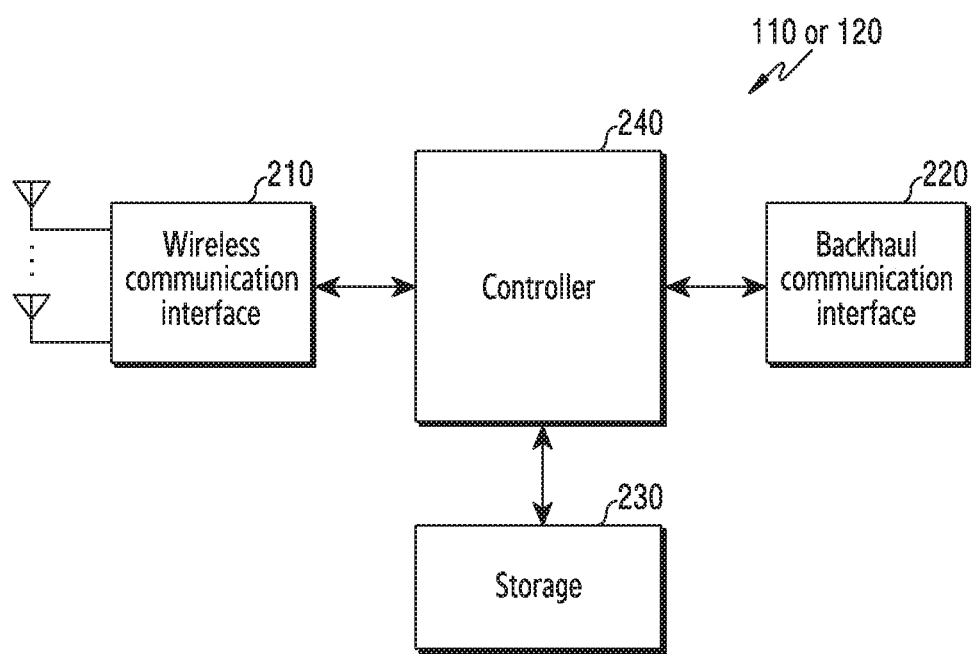
FIG. 2 illustrates a configuration of a base station in a wireless communication system according to an embodiment of the disclosure.

FIG. 2 illustrates a configuration of a base station in a wireless communication system according to an embodiment of the disclosure. The configuration of FIG. 2 may be understood as the configuration of the base station 110 or the base station 120. A term, such as 'portion' or '~er' indicates a unit for processing at least one function or operation, and may be implemented using hardware, software, or a combination of hardware and software.

Referring to FIG. 2, the base station includes a wireless communication unit 210, a backhaul communication unit 220, a storage unit 230, and a control unit 240.

The wireless communication unit 210 transmits and receives signals over a radio channel. For example, the wireless communication unit 210 performs a conversion function between a baseband signal and a bit string according to a physical layer standard of the system. For example, in data transmission, the wireless communication unit 210 generates complex symbols by encoding and modulating a transmit bit string. In addition, in data reception, the wireless communication unit 210 restores a receive bit string by demodulating and decoding a baseband signal.

In addition, the wireless communication unit 210 up-converts the baseband signal to a radio frequency (RF) band signal, transmits it via an antenna, and down-converts an RF band signal received via an antenna to a baseband signal. For doing so, the wireless communication unit 210 may include a transmit filter, a receive filter, an amplifier, a mixer, an oscillator, a digital to analog convertor (DAC), an analog to digital convertor (ADC), and the like. In addition, the wireless communication unit 210 may include a plurality of transmit and receive paths. Further, the wireless communication unit 210 may include at least one antenna array including a plurality of antenna elements.

In view of hardware, the wireless communication unit 210 may include a digital unit and an analog unit, and the analog unit may include a plurality of sub-units according to an operating power and an operating frequency. The digital unit may include at least one processor (e.g., a digital signal processor (DSP)).

As such, the wireless communication unit 210 transmits and receives the signals. Hence, whole or part of the wireless communication unit 210 may be referred to as a transmitter, a receiver, or a transceiver. In the following, the transmission and the reception over the radio channel embrace the above-stated processing of the wireless communication unit 210.

The backhaul communication unit 220 provides an interface for communicating with other nodes in the network. For example, the backhaul communication unit 220 converts a bit sting transmitted from the base station to another node, for example, to another access node, another base station, an upper node, or a core network, to a physical signal, and converts a physical signal received from the other node to a bit string.

The storage unit 230 stores a basic program for operating the base station, an application program, and data, such as setting information. The storage unit 230 may include a volatile memory, a non-volatile memory, or a combination of a volatile memory and a non-volatile memory. The storage unit 230 provides the stored data in response to a request of the control unit 240.

The control unit 240 controls general operations of the base station. For example, the control unit 240 transmits and receives signals through the wireless communication unit 210 or the backhaul communication unit 220. In addition, the control unit 240 records and reads data in and from the storage unit 230. The control unit 240 may execute functions of a protocol stack required by a communication standard. According to an embodiment of the disclosure, the protocol stack may be included in the wireless communication unit 210. For doing so, the control unit 240 may include at least one processor. According to various embodiments of the disclosure, the control unit 240 may control the base station (e.g., the base station 110 or the base station 120) to carry out operations to be explained according to various embodiments.

Figure 3:
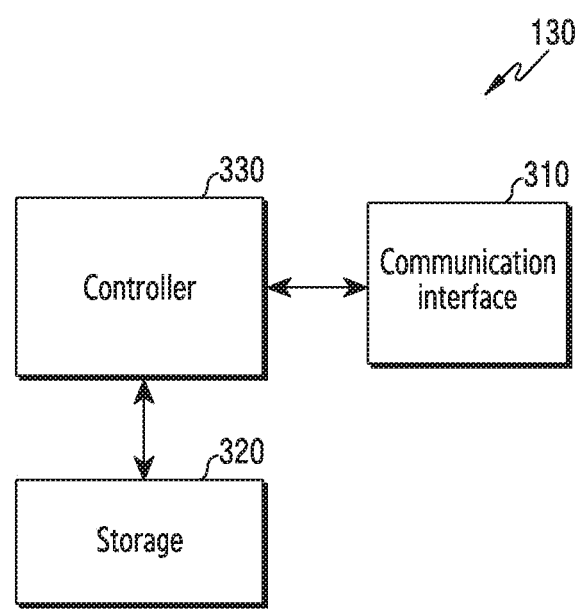
FIG. 3 illustrates a configuration of a management device in a wireless communication system according to an embodiment of the disclosure.

FIG. 3 illustrates a configuration of a management device in a wireless communication system according to an embodiment of the disclosure. The configuration may be understood as the configuration of the management device 130. A term, such as 'portion' or '~er' indicates a unit for processing at least one function or operation, and may be implemented using hardware, software, or a combination of hardware and software.

Referring to FIG. 3, the management device 130 includes a communication unit 310, a storage unit 320, and a control unit 330.

The communication unit 310 provides an interface for communicating with other devices (e.g., the base station) in the network. For example, the communication unit 310 converts a bit string transmitted from the management device to another device, to a physical signal, and converts a physical signal received from another device, to a bit string. For example, the communication unit 310 may transmit and receive signals. Hence, the communication unit 310 may be referred to as a modem, a transmitter, a receiver, or a transceiver. In so doing, the communication unit 310 may enable the management device to communicate with other devices or the system over backhaul connection (e.g., wired backhaul or wireless backhaul) or the network.

The storage unit 320 stores a basic program for operating the management device, an application program, and data, such as setting information. The storage unit 320 may include a volatile memory, a non-volatile memory, or a combination of a volatile memory and a non-volatile memory. The storage unit 320 provides the stored data according to a request of the control unit 330.

The control unit 330 controls general operations of the management device. For example, the control unit 330 transmits and receives signals through the communication unit 310. In addition, the control unit 330 records and reads data in and from the storage unit 320. For doing so, the control unit 330 may include at least one processor. According to various embodiments of the disclosure, the control unit 330 may control the management device to carry out operations, to be explained, according to various embodiments.

Figure 4A:
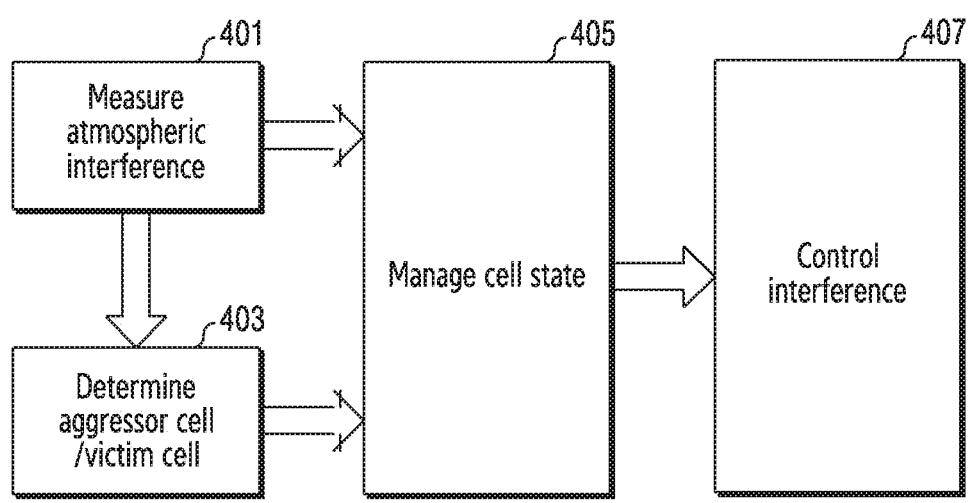
FIG. 4A illustrates procedures for managing interference in a wireless communication system according to an embodiment of the disclosure.

FIG. 4A illustrates procedures for managing interference in a wireless communication system according to an embodiment of the disclosure. The interference may indicate atmospheric interference of a signal transmitted from a particular cell on communication of at least one other cell, caused by propagation delay.

Referring to FIG. 4A, atmospheric interference management procedures according to various embodiments of the disclosure may include a first procedure 401 for measuring the atmospheric interference, a second procedure 403 for determining the aggressor cell and the victim cell, a third procedure 405 for managing a cell state, and a fourth procedure 407 for controlling the interference.

In the first procedure 401, the base station may measure interference from another cell. The base station may measure a signal (e.g., a DL signal) of the other cell. To identify an interferer, the base station may identify a cell which transmits the signal, from the received signal. By measuring the received signal, the base station may generate an interference measurement result. The interference measurement result may include at least one of interfering cell information, information relating to presence or absence of the atmospheric interference, information of an atmospheric interference degree, and information of the number of the interfering cells.

In the second procedure 403, the management device may identify a cell for the interference management in various manners based on the interference measurement result of the first procedure 401, and determines characteristics of a corresponding cell. The characteristics of the cell may include at least one of whether the particular cell is the aggressor cell, whether the particular cell is the victim cell, whether the particular cell is the aggressor cell and the victim cell, or whether the particular cell is none of the aggressor cell and the victim cell. According to an embodiment of the disclosure, an individual base station (an individual cell) may determine the characteristics of the cell, that is, determine which cell is the aggressor cell or the victim cell. For example, a base station of a victim cell may measure a signal from another cell on its cell, and determine that a corresponding cell is the victim cell, based on a measurement result.

In the third procedure 405, the management device may manage the state of each cell, based on the interference measurement result of the first procedure 401 and the cell characteristic determination result of the third procedure 405. The cell state may indicate whether the interference is managed, or the interference management degree. For example, the cell state may include whether to mitigate effect of the cell (i.e., mitigate the interference) if the corresponding cell is the aggressor cell. The interference mitigation may be referred to as DL interference control. For example, the cell state may include whether to avoid the atmospheric interference (i.e., avoid the interference) if the corresponding cell is the victim cell. The interference cancellation may be referred to as UL interference control. For example, the cell state may include the interference mitigation degree of the aggressor cell or the atmospheric interference avoiding degree of the victim cell. Meanwhile, the management device's determining not to mitigate the interference of the corresponding cell which is the aggressor cell, or the management device's determining not to take measures for the victim cell may be understood as an embodiment of the interference management of the disclosure.

In the fourth procedure 407, the management device may perform the interference control. The management device may perform the interference control according to the configuration state of each cell of the third procedure 405. For example, if a first cell is the aggressor cell and needs the interference mitigation, the management device may control the interference of the first cell. The management device may transmit a control command for explicitly or implicitly mitigating the interference, to a base station of the first cell. For example, if a second cell is the victim cell and needs the interference avoidance, the management device may control the interference of the second cell. The management device may transmit a control command for explicitly or implicitly avoiding the interference, to a base station of the second cell.

The atmospheric interference measuring procedure of the procedures of FIG. 4A is performed by the individual base station, and the other procedures are conducted by the management device. However, the procedures may be distributed to the individual base station and the management device in various fashions. According to an embodiment of the disclosure, each base station may generate the interference measurement result of the individual cell, and transmit the generation result to the management device. The management device may collect the measurement result of the individual cell. The management device may perform the interference control based on the collected measurement results. According to another embodiment of the disclosure, each base station may generate cell information including at least one of whether the interference control is required based on the interference measurement result, and the required interference control degree, and transmit the cell information to the management device. The management device may collect the cell information of the individual cell. The management device may perform the interference control based on the collected cell information.

The interference management according to various embodiments of the disclosure is performed by the management device and the interference measurement is performed at the individual base station (the individual cell) in the following descriptions, but various modifications may be made. For example, it is noted that the base station and the management device for fulfilling the interference management procedures of the disclosure may be implemented in various manners besides a distributed-centralized manner. According to an embodiment of the disclosure, the management device may be implemented to include a plurality of individual management devices. For example, a first management device for the first procedure may receive the measurement result from each cell, a second management device for the second procedure 403 may collect the measurement result from the first management device, and a third management device may perform the third and fourth procedures based on the measurement results and transmit an interference control command to the individual cells. According to another embodiment of the disclosure, the management device may be disposed in the base station, to conduct the individual cell operation. The measurement result of each cell may be transmitted to the base station including the management device. For example, a message including the interference measurement result may be transmitted between base stations via an X2 interface. For example, a message including the interference measurement result may be transmitted from the base station to a higher network entity including the individual management device through signaling. According to yet another embodiment of the disclosure, the operations for managing the atmospheric interference may be carried out by one entity. The management device may be included in the base station of the victim cell. The base station may measure the interference from another cell on a particular cell, determine that the measured cell is the victim cell, and limit UL scheduling, perform handover, or set an additional UL carrier to avoid the interference.

Figure 4B:
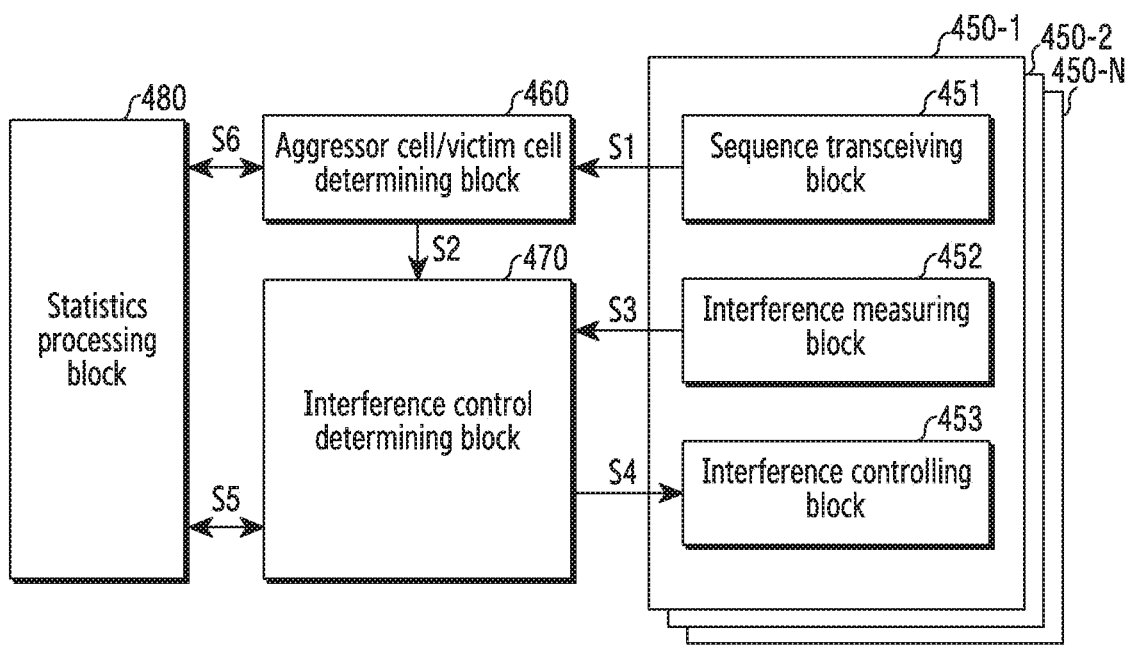
FIG. 4B illustrates a functional configuration for procedures for managing an interference in a wireless communication system according to an embodiment of the disclosure.

FIG. 4B illustrates a functional configuration for procedures for managing an interference in a wireless communication system according to an embodiment of the disclosure. The identical or similar procedures of FIG. 4A shall be omitted in explanations.

Referring to FIG. 4B, base stations (or cells) 450-1 through 450-N each may include a sequence transceiving block 451, an interference measuring block 452, and an interference controlling block 453. For the interference control according to various embodiments of the disclosure, an aggressor cell/victim cell determining block 460, an interference control determining block 470, and a statistics processing block 480 may be configured. According to various embodiments of the disclosure, the aggressor cell/victim cell determining block 460, the interference control determining block 470, and the statistics processing block 480 may be implemented by a management device (e.g., the management device 130 of FIG. 1). According to an embodiment of the disclosure, at least one of the aggressor cell/victim cell determining block 460, the interference control determining block 470, and the statistics processing block 480 may be implemented by a separate network entity or a base station.

The sequence transceiving block 451 may be configured to transmit or receive a DL signal sequence for measuring atmospheric interference per cell. The interference measuring block 452 may be configured to measure the atmospheric interference, by measuring a DL signal transmitted from another cell. The interference controlling block 453 may be configured to perform DL interference control (i.e., interference mitigation) of an aggressor cell or UL interference control (i.e., interference avoidance) of a victim cell under control of the interference control determining block 470.

The aggressor cell/victim cell determining block 460 may be configured to identify the aggressor cell or the victim cell, based on the measurement result obtained per cell. According to an embodiment of the disclosure, if the management device is connected to each cell in the centralized manner, the aggressor cell/victim cell determining block 460 may obtain the sequence measurement result from the sequence transceiving block 451 of each cell.

The interference control determining block 470 may be configured to determine whether it is efficient to control the interference of at least one aggressor cell or at least one victim cell. For example, the interference control determining block 470 may determine whether to control the interference. Effect of the atmospheric interference may reduce by limiting scheduling of all the aggressor cells or handing over all the victim cells, but it may be inefficient in that cell capacity is lowered in terms of the entire network and unnecessary procedures are repeated.

The statistics processing block 480 may be configured to collect information relating to the above-stated interference control procedure. Statistics information may be utilized to determine the aggressor cell/victim cell or to determine the interference control. The statistics processing block 480 may be configured to store the aggressor cell/victim cell determination result, the interference control result, the interference measurement result, and statistics of time/weather/temperature/humidity/traffic. In addition, the statistics processing block 480 may be configured to provide the stored statistics to the aggressor cell/victim cell determining block 460 and the interference control determining block 470.

The aggressor cell/victim cell determining block 460 may calculate the aggressor cell/victim cell determination result which is highly likely to occur in a particular condition and improve accuracy, by utilizing the statistics of time/weather/temperature/humidity/traffic and geographical information in addition to the aggressor cell/victim cell determination result statistics information. If not frequently determining the aggressor cell/victim cell (e.g., computation power is limited, hardware is limited, or radio resources are limited, etc.), the aggressor cell/victim cell determining block 460 may be configured to infer characteristics of the aggressor cell/victim cell relation which varies in time, using the accumulated statistics.

The interference control determining block 470 may be configured to identify an efficient interference control operation per particular condition by utilizing the aggressor cell/victim cell determination result, aggressor cell/victim cell state determination, the time/weather/temperature/humidity/traffic statistics, and the geographical information.

A procedure S1 may include transmission of measurement information from the sequence transceiving block 451 to the aggressor cell/victim cell determining block 460. In the procedure S1, the base station may transmit the measurement information to the management device. The measurement information may include at least one of an aggressor cell/victim cell relation per cell, a signal strength measured with the sequence, an aggressor cell distance determined with the sequence.

A procedure S2 may include transmission of the cell determination information from the aggressor cell/victim cell determining block 460 to the interference control determining block 470. In the procedure S2, the management device may acquire the cell determination information used to determine the aggressor cell/victim cell, to determine the interference control. The determination information may include at least one of the aggressor cell/victim cell relation between cells between cells, the signal strength measured with the sequence, the aggressor cell distance determined with the sequence.

A procedure S3 may include transmission of atmospheric interference information from the interference measuring block 452 to the interference control determining block 470. In the procedure S3, the management device may receive the atmospheric interference information from the base station. The atmospheric interference information may include at least one of presence or absence of the atmospheric interference in a corresponding cell, and a representative interference distance. The representative interference distance may indicate the longest cell distance between the victim cell and the aggressor cell. Alternatively, the representative interference distance may indicate the shortest cell distance between the victim cell and the aggressor cell.

A procedure S4 may include transmission of interference control information from the interference control determining block 470 to the interference controlling block 453. In the procedure S4, the management device may transmit the interference control information to each cell. The interference control information may indicate an interference control state per cell of the aggressor cell, and an interference avoidance state per cell of the victim cell. In addition, the interference control information may include an additional interference control state of FIG. 9 and FIG. 10 to be explained.

A procedure S5 may include transmission of the statistics information between the aggressor cell/victim cell determining block 460 and the statistics processing block 480. A procedure S6 may include transmission of the statistics information between the interference control determining block 470 and the statistics processing block 480. In the procedures S5 and S6, the management device may obtain the statistics information. The statistics information may include at least one of aggressor cell/victim cell determination result statistics, aggressor cell/victim cell state determination result statistics, interference measurement result statistics, and time/weather/temperature/humidity/traffic statistics.

Figure 5:
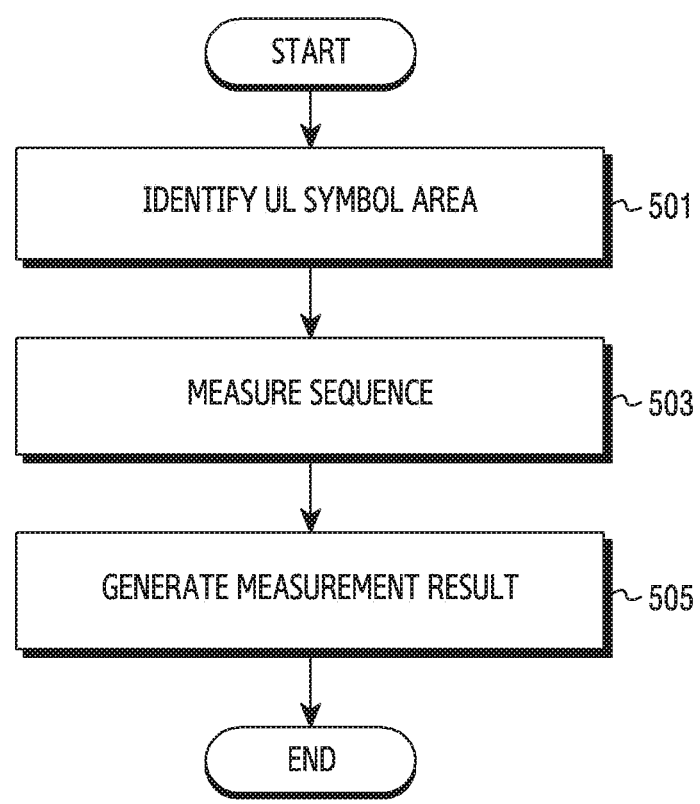
FIG. 5 illustrates a flowchart of a base station for measuring atmosphere interference in a wireless communication system according to an embodiment of the disclosure.

FIG. 5 illustrates a flowchart of a base station for measuring atmosphere interference in a wireless communication system according to an embodiment of the disclosure. The base station represents the base station 120 or the base station 110 of FIG. 1.

Referring to FIG. 5, in operation 501, the base station may identify a UL symbol area. The atmospheric interference indicates effect of a DL signal of at least one other cell, which comes into an UL area of a corresponding cell due to propagation delay, on UL communication between a base station and a terminal of the corresponding cell. The base station affected by the atmospheric interference may identify a UL time duration first to measure such interference.

The UL time duration may be defined according to the communication system. For example, a radio frame in the LTE TDD communication system may include a DL subframe, an SSF, and a UL subframe. The SSF may include the DwPTS, the GP, and the UpPTS as shown in Table 2. The UL time duration may include symbols of the UpPTS or symbols of the UL subframe. For example, the DL-UL pattern in the NR TDD communication system may be set per cell. A duration to which the DL-UL pattern is applied may include a DL time duration and a UL time duration. The UL time duration may be determined by the number of UL slots, the number of UL symbols, or the number of UL slots and UL symbols, defined backwards in the periodicity for the DL-UL pattern.

The base station may identify the UL symbol area for measuring the atmospheric interference in the UL time duration. For example, the base station may identify $M_1$-ary symbols (where $M_1$ is a natural number) corresponding to the beginning part in the UL time area. For example, the base station may identify $M_2$-ary symbols (where $M_2$ is a natural number) periodically allocated in the UL time domain. For example, the base station may identify $M_3$-ary symbols (where $M_3$ is a natural number) dynamically allocated in the UL time domain.

In operation 503, the base station may measure a sequence. The base station may measure the sequence of a DL signal transmitted from another cell in the UL symbol area. In some embodiments of the disclosure, the DL signal transmitted from the other cell may be a signal defined on the communication standard. For example, the signal transmitted from the other cell may include at least one of a cell-specific reference signal (CRS), a channel state information-reference signal (CSI-RS), a demodulation-RS (DM-RS), a beam reference signal (BRS), a beam refinement reference signal (BRRS), a synchronization signal (SS), and an SS/physical broadcast channel (PBCH) block. In some other embodiments of the disclosure, the DL signal transmitted from the other cell may be a signal set by an operator or a network provider. For example, the signal transmitted from the other cell may have a sequence separately defined, and this sequence and a resource area (time-frequency resource) transmitting the sequence may be defined variously per cell.

A metric for measuring the signal of the base station may include at least one of, for example, reference signal received power (RSRP), beam reference signal received power (BRSRP), reference signal received quality (RSRQ), received signal strength indicator (RSSI), signal to interference and noise ratio (SINR), carrier to interference and noise ratio (CINR), SNR, error vector magnitude (EVM), bit error rate (BER), and block error rate (BLER). Besides, other terms having the equivalent technical meaning or other metrics indicating the channel quality may be used. The signal of the other cell measured at the base station may cause interference on the cell of the base station.

Based on the channel quality of the signal of the other cell, the base station may measure the interference of the corresponding cell. For example, the base station may determine an interference amount from the other cell, based on the signal strength of the sequence of the other cell. According to an embodiment of the disclosure, the base station may store and manage the measured interference amount as a value based on the metric used for the measurement. According to an embodiment of the disclosure, the base station may identify a specific interference level among interference levels based on the measured metrics, and store and manage the identified interference level.

The base station may identify the cell which transmits the sequence, by receiving the sequence. Cells of the network may transmit and receive defined sequences using their defined resource (e.g., time resource, frequency resource, time-frequency resource). In some embodiments of the disclosure, the base station may identify the cell transmitting the signal, based on resource information (e.g., time information (frame, subframe, symbol, period), frequency information (bandwidth part (BWP), resource block (BWP), subband)) of the received signal. In some embodiments of the disclosure, the base station may identify the cell transmitting the signal, based on sequence information (e.g., OCC information applied to the sequence, a sequence type, a sequence length) of the received signal. In some embodiments of the disclosure, the base station may identify the cell transmitting the signal, based on a combination of the sequence information and the resource information. For example, it is assumed that a first cell transmits a sequence, and then a second cell receives a sequence. To identify a particular cell from the sequence, the second cell may pre-obtain sequence information transmitted per cell or resource information for the sequence transmission. The second cell may identify the first cell among a plurality of cells, based on at least one of sequence information of the first cell and resource information of the sequence of the first cell. Herein, the first cell may be the aggressor cell, and the second cell may be the victim cell.

In operation 505, the base station may generate the measurement result. By measuring the sequence, the base station may recognize a potential aggressor cell. For example, the base station may identify the interferer cell, based on the sequence. The measurement result may include interferer information. The base station may identify at least one interfering cell which affects the base station, based on the sequence per cell. For example, the base station may generate the measurement result including the cell information indicating the interferer, from the measurement result of operation 503.

By measuring the sequence of the DL signal of the cell, the base station may generate the measurement result of the atmospheric interference. The atmospheric interference, which is caused by the propagation delay of the DL signal, attenuates as time passes. Accordingly, there may be a difference between the interference amount measured relatively at the front and the interference amount measured at the back in the UL symbol area.

Since the interference degree varies based on the time, the base station may generate the measurement result in various fashions. In some embodiments of the disclosure, the measurement result may include presence or absence of the atmospheric interference. Based on the measurement result of operation 503, the base station may determine the presence or the absence of the atmospheric interference in the cell of the base station. According to an embodiment of the disclosure, the base station may determine the interference level with respect to front N-ary (where N is a natural number) symbols of the symbols of the UL symbol area. The base station may determine the presence of the atmospheric interference if the interference level exceeds a first threshold. According to another embodiment of the disclosure, the base station may determine a first interference level of front $N_1$-ary (where $N_1$ is a natural number) symbols (hereafter, referred to as a beginning part) of the symbols of the UL symbol area, and a second interference level of back $N_2$-ary (where $N_2$ is a natural number) symbols (hereafter, referred to as an end part) of the symbols of the UL symbol area. If a difference of the first interference level and the second interference level is greater than a second threshold, the base station may determine the presence of the atmospheric interference. It is necessary to consider the interference change based on time because there may be interference with other cell besides the atmospheric interference. According to yet another embodiment of the disclosure, if the interference level of first N-ary symbols of the symbols of the UL symbol area exceeds the first threshold and the interference level difference of the beginning part and the end part of the symbols of the UL symbol area exceeds the second threshold, the base station may determine the presence of the atmospheric interference of the corresponding cell. This is because it is necessary to more accurately measure the presence or the absence of the interference based on a plurality of conditions.

In some embodiments of the disclosure, the measurement result may include the degree (or the amount) of the atmospheric interference. Based on the measurement result of operation 503, the base station may determine the degree of the atmospheric interference on the cell of the base station. According to an embodiment of the disclosure, the degree of the atmospheric interference may be determined based on the interference level of the N-ary symbols corresponding to the beginning part of the UL symbol area. For example, as the received signal strength of the signals measured from the N-ary symbols increases, the base station may increase the interference level for the atmospheric interference. According to another embodiment of the disclosure, the degree of the atmospheric interference may be determined based on the difference of the first interference level for the $N_1$-ary symbols corresponding to the beginning part of the UL symbol area and the second interference level for the $N_2$-ary symbols. For example, if the received signal strength of the signals measured for the $N_1$-ary symbols is higher than the received signal strength of the signals measured for the $N_2$-ary symbols, the base station may increase the interference level of the atmospheric interference.

In some embodiments of the disclosure, the measurement result may include an atmospheric interference distance. The DL signal which causes the atmospheric interference attenuates in the signal strength during long-time transmission on the radio channel. The base station may determine the atmospheric interference distance based on the measurement result of operation 503. The atmospheric interference distance may be related to the distance between the cells. To determine the atmospheric interference distance, the base station may divide the UL symbol area into two groups. For example, the UL symbol area may include M-ary symbols, and the symbols of the UL symbol area may correspond to [0, . . . , M−1]. The two groups may include a first group corresponding to the beginning part of the UL symbol area and a second group corresponding to the end part of the UL symbol area. For example, the first group may include symbols [0, . . . , m−1] of the UL symbol area, and the second group may include symbols [m, . . . , M−1] of the UL symbol area. By adjusting the value m, the base station may identify m which maximizes the difference of the interference level of the first group and the interference level of the second group. For example, the first group may include symbols [n−K, n−K+1 . . . , n−1] of the UL symbol area, and the second group may include symbols [n, . . . , n+K−1] of the UL symbol area. By adjusting the value n, the base station may identify n which maximizes the difference of the interference level of the first group and the interference level of the second group. The base station may determine the interference distance, based on a difference of the DL resource and the time resource of the atmospheric interference. The interference distance may be referred to as a cell distance, a cell interference distance, and an atmospheric interference distance. For example, the base station may determine the interference distance based on the end part (e.g., the last symbol of the DwPTS) of the DL time duration and the end part (e.g., the symbol m) of the atmospheric interference. According to an embodiment of the disclosure, the threshold for determining the presence or the absence of the atmospheric interference of the aforementioned embodiment may be determined based on the interference distance.

According to an embodiment of the disclosure, the interference distance may be used to determine the aggressor cell/the victim cell of the cell. For example, interference distance information may be used as data for determining the presence or the absence of the aggressor cell/the victim cell. For example, if the interference distance is greater than a distance of an interferer of major interference (dominant interference) on the victim cell, the victim cell may not determine the interferer as the aggressor cell.

In some embodiments of the disclosure, the measurement result may include the number of interferers which interfere with one measurement cell. For example, the base station may determine the number of the interferer cells (hereafter, referred to as interfering cells), based on the measurement result of operation 503. The interfering cells may be aggressor cells. The base station may measure a sequence of a particular cell and thus determine whether the particular cell acts as the interferer. The base station may generate the measurement result including the interfering cell information.

The operations of FIG. 5 for measuring the atmospheric interference may be repeated. In some embodiments of the disclosure, the base station may periodically conduct the interference control operations of FIG. 5 according to a measurement period. The base station may periodically generate the measurement result and transmit the measurement result to the management device.

Although not depicted in FIG. 5, the base station may transmit the measurement result to the management device. The management device may collect atmospheric interference information of each cell. By collecting the atmospheric interference information from the base station, the management device may control the atmospheric interference. Embodiments for controlling the atmospheric interference are described in FIG. 6 through FIG. 10.

Figure 6:
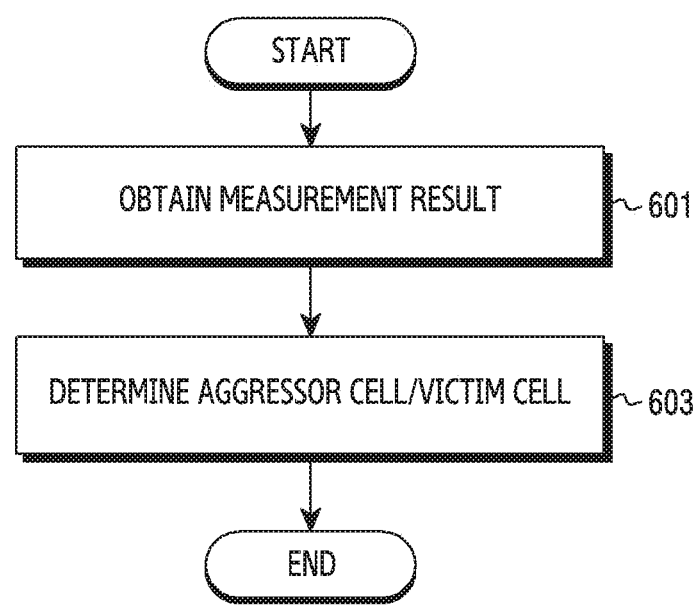
FIG. 6 illustrates a flowchart of a management device for determining an aggressor cell and/or victim cell in a wireless communication system according to an embodiment.

FIG. 6 illustrates a flowchart of a management device for determining an aggressor cell and/or victim cell in a wireless communication system according to an embodiment of the disclosure. The management device represents the management device 130 of FIG. 1.

Referring to FIG. 6, the management device may obtain a measurement result in operation 601. The measurement result may correspond to the measurement result of operation 505 of FIG. 5. The management device may obtain the measurement result from each base station. The management device may obtain a plurality of measurement results of a plurality of cells. For example, in a centralized network where one management device is connected to a plurality of base stations, the management device may collect the measurement result from each base station. For example, in a distributed network where the management device is located at a particular base station and other base stations share the measurement result with the particular base station, the management device may collect the measurement result from each base station. According to an embodiment of the disclosure, the management device may be located at a particular base station and obtain only measurement result of the particular base station. For example, the management device may be located at a base station of a victim cell and obtain only measurement result of the victim cell.

In operation 603, the management device may determine the aggressor cell and/or victim cell. The management device may identify the aggressor cell and the victim cell as a cell for the interference management (hereafter, referred to as an interference management cell). The interference management cell may indicate a cell on which the interference control is performed according to various embodiments of the disclosure. The aggressor cell and the victim cell are relative. The victim cell is interfered by the atmospheric interference, and the aggressor cell indicates a counterpart cell specified as the interferer of the atmospheric interference. The management device may identify the aggressor cell to mitigate the interference, or identify the victim cell to avoid the interference. For example, the interference management cell may be the aggressor cell or the victim cell. Now, determining which cell is the aggressor cell or the victim cell for the sake of the interference control may be referred to as determining the aggressor cell/victim cell.

The management device may determine the aggressor cell/victim cell for each cell. The management device may identify the aggressor cell among a plurality of cells based on the measurement result. In addition, the management device may identify the victim cell among the plurality of the cells based on the measurement result. The cell may or may not be the aggressor cell. The cell may or may not be the victim cell. For example, the management device may determine which cell is the aggressor cell, the victim cell, the aggressor cell and the victim cell, or neither the aggressor cell nor the victim cell.

In some embodiments of the disclosure, based on the measurement result of each cell, the management device may identify at least one interference management cell among the cells of the network. For example, the management device may determine the aggressor cell/victim cell in only some cells of the network, rather than determining the aggressor cell/victim cell in all the cells of the network. According to an embodiment of the disclosure, the management device may determine the aggressor cell/victim cell with respect to a cell having the atmospheric interference. For example, the management device may receive the measurement result from a first cell. The measurement result of the first cell may include information indicating the atmospheric interference in the first cell, and information indicating the aggressor cell which causes the atmospheric interference on the first cell is a second cell and a third cell. The management device may determine the first cell as a candidate cell. For example, the management device may receive a measurement result from a fourth cell. The fourth cell may not suffer from the atmospheric interference. The management device may exclude the fourth cell from the candidate cell.

As above, the management device may improve efficiency of the interference control, by including only some cells in the interference control, rather than controlling the interference of all the cells. For example, if sequences for determining the presence or the absence of the atmospheric interference are defined, resources allocated for the sequences may reduce by including only specific cells in the interference control. In addition, as the candidates of the reduced sequences decrease, the aggressor cell may be identified more easily. For example, interference in UL reception of at least one other cell may reduce, by including only particular cells in the interference control. Further, power for calculating the sequence may decrease, by including only particular cells in the interference control.

Although not depicted in FIG. 6, according to various embodiments of the disclosure, the management device may store the relation of the aggressor cell and the victim cell with various metrics based on the measurement result. For example, the relation of the aggressor cell and the victim cell may be defined as shown in the following table.

TABLE 3

| number | Aggressor cell ID | Victim cell ID | signal strength | distance |
|---|---|---|---|---|
| 1 | 1 | 2 | 10 | 20 |
| 2 | 2 | 1 | 40 | 10 |
| 3 | 1 | 3 | 10 | 15 |
| 4 | 1 | 4 | 10 | 10 |

The relation of the aggressor cell and the victim cell may be asymmetric. For example, if the first cell is the aggressor cell and the second cell is the victim cell, it does not always mean that the second cell is the aggressor cell and the first cell is the victim cell. Accordingly, the management device may manage the relation of the cells by separating the aggressor cell and the victim cell. The signal strength may be the power of the received sequence, that is, the interference level determined by the received strength or the received sequence. The distance may be determined based on the position of the transmit symbol of the sequence and the sequence reception time.

Although not depicted in FIG. 6, the management device may determine the aggressor cell/victim cell per cell, and then notify a determination result to each cell. While the management device which collects the measurement result of each cell determines the aggressor cell/victim cell based on the interference measurement in FIG. 6, a base station of each cell may determine the aggressor cell/victim cell. According to an embodiment of the disclosure, the base station of each cell may identify the aggressor cell and the victim cell based on the measurement result, and transmit the identified cell information to the management device. The management device may perform the interference control of FIG. 7 through FIG. 10 according to the cell information, to be explained.

Figure 7:
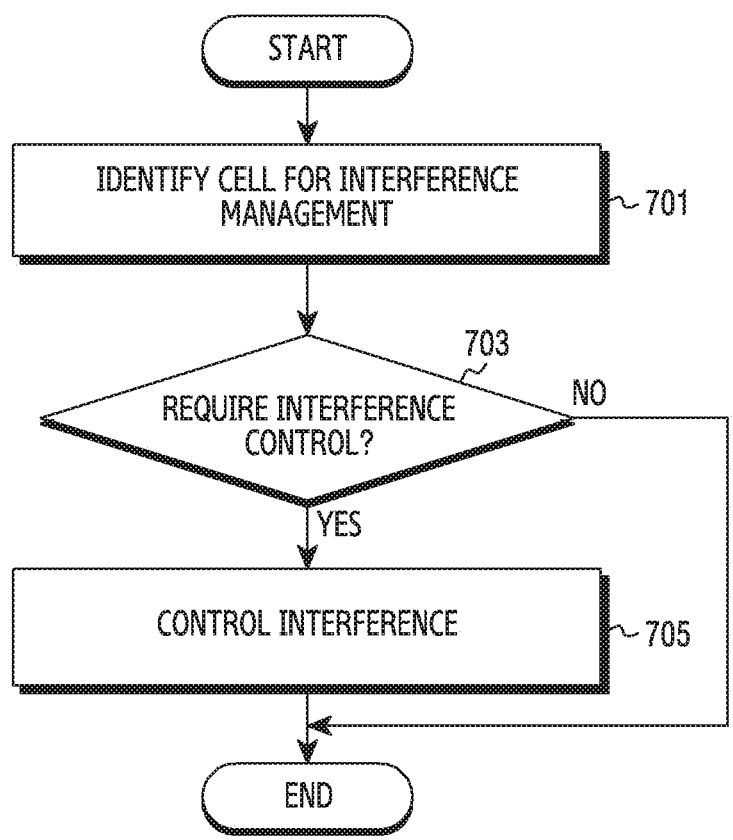
FIG. 7 illustrates a flowchart of a management device for controlling interference in a wireless communication system according to an embodiment of the disclosure.

FIG. 7 illustrates a flowchart of a management device for controlling interference in a wireless communication system according to an embodiment of the disclosure. The management device represents the management device 130 of FIG. 1. While operations of the management device for controlling the atmospheric interference are described in the following, at least part of the operations of FIG. 7 may be carried out at the base station.

Referring to FIG. 7, in operation 701, the management device may identify a cell for the interference management. For example, the management device may identify the interference management cell. The interference management cell may indicate a cell used to determine the interference control. The management device may identify an aggressor cell or a victim cell for the interference control.

In operation 703, the management device may determine whether to control interference of the interference management cell. The interference control according to various embodiments of the disclosure may include interference control of the aggressor cell and interference control of the victim cell. Since the aggressor cell operates as the interferer, it is required to reduce effect of a signal transmitted on the aggressor cell. Hence, the interference control of the aggressor cell may be referred to as interference mitigation. Since the victim cell is affected by the interferer in data communication, it is required to reduce data communication in a carrier of the cell. Hence, the interference control of the victim cell may be referred to as interference avoidance.

In some embodiments of the disclosure, the management device may selectively mitigate the interference of some aggressor cell(s), rather than mitigating the interference of all the aggressor cells. For example, if the DL scheduling area is reduced for all the aggressor cells, loss increases in terms of resource efficiency. The management device may identify at least one aggressor cell for the interference mitigation. If the aggressor cell satisfies a condition for performing the interference mitigation (hereafter, referred to as an interference mitigation condition), the management device may determine to mitigate the interference of the aggressor cell as the interference control. A specific example of the interference mitigation condition shall be described in FIG. 8A.

In some embodiments of the disclosure, the management device may selectively perform the interference avoidance on some victim cell(s), rather than conducting the interference avoidance on all the victim cells. For example, if all the victim cells are handed over to another carrier, the cell capacity of the victim cell severely reduces and, after the atmospheric interference is cancelled, some cells are handed over again, to cause ping-pong. The management device may identify at least one victim cell for the interference avoidance. If the victim cell satisfies a condition for performing the interference avoidance (hereafter, referred to as an interference avoidance condition), the management device may determine to avoid the interference of the victim cell, as the interference control. A specific example of the interference avoidance condition shall be described in FIG. 8B.

The management device may perform operation 705 if the interference control is required. If the interference control is not required, the management device may finish the interference control.

In operation 705, the management device may perform the interference control. For the interference control, the management device may transmit an interference control command to a base station of each cell. For example, the management device may transmit an interference mitigation command to a base station of the aggressor cell. For example, the management device may transmit an interference avoidance command to a base station of the victim cell. According to an embodiment of the disclosure, the management device may transmit the command to the aggressor cell and concurrently transmit the command to the victim cell. This is because it is necessary to manage the aggressor cell and the victim cell, which have inevitable relation, with the same setting. According to another embodiment of the disclosure, the management device may transmit the command to the aggressor cell at a particular time and transmit the command to the victim cell at other time. One aggressor cell may include a plurality of victim cells, or a plurality of aggressor cells may include one victim cell.

According to various embodiments of the disclosure, the management device may mitigate the atmospheric interference of the aggressor cell. The management device may transmit a control command for the explicit or implicit interference mitigation, to the base station of the aggressor cell. In some embodiments of the disclosure, the management device may reduce the DL time duration for the aggressor cell. For example, in the LTE TDD communication system, the management device may change the DL-UL configuration of Table 1 or the SSF configuration of Table 2. By shortening the DL time, the management device may minimize the DL signal of the aggressor cell coming into the UL signal area of the victim cell. For example, the management device may change the SSF configuration #7 of the aggressor cell with the SSF configuration #5. As the number of the symbols of the DwPTS reduces from ten to three, DL scheduling time may reduce. As the difference between the symbol carrying the DL signal of the aggressor cell and the UL time duration of the victim cell increases, the atmospheric interference may decrease. For example, in the NR TDD communication system, the management device may change the DL-UL pattern of the aggressor cell. The management device may control the number of DL slots in the DL-UL pattern of the aggressor cell to fall below a threshold. For example, the management device may change the number of DL symbols in a flexible slot of the DL-UL pattern from five to one. By reducing the number of the DL symbols of the aggressor cell, the management device may lessen the effect of the atmospheric interference of the aggressor cell.

In some embodiments of the disclosure, the management device may decrease transmit power of the aggressor cell. The management device may transmit a transmit power decrease command to the base station of the aggressor cell. As the transmit power of the aggressor cell is decreased, coverage of the aggressor cell may reduce. As the coverage of the DL signal of the aggressor cell decreases, the received power of the DL signal transmitted to the victim cell may also decrease. Thus, the interference on the victim cell may reduce due to the decrease of the transmit power.

In some embodiments of the disclosure, the management device may adjust an antenna configuration for the aggressor cell. The DL signal may be transmitted via an antenna of the base station of the aggressor cell. The management device may transmit the antenna configuration for reducing the coverage of the aggressor cell, to the base station of the aggressor cell. For example, the antenna configuration may include antenna tilt. By adjusting a radiation angel of the DL signal, a propagation distance of the DL signal of the aggressor cell may be reduced. For example, the antenna configuration may include the number of antennas used. By reducing the number of the antennas, the propagation distance of the DL signal of the aggressor cell may be reduced.

In some embodiments of the disclosure, the management device may reduce scheduling of the aggressor cell. The management device may decrease or stop a rate of the DL scheduling of the aggressor cell, to the base station of the aggressor cell. For example, to reduce the DL signal inflow, the management device may reduce a size of the frequency area allocated to the DL signal. For example, the management device may set the size of the frequency area allocated to the subframe (or the DL slot) of the end part in the TDD communication system, to be below a reference value (e.g., six PRBs). For example, the management device may transmit to the base station a command for limiting the DL scheduling in the last DL slot of the DL time durations of the DL-UL pattern.

According to various embodiments of the disclosure, the management device may control the victim cell to avoid the atmospheric interference. The management device may transmit a control command for explicitly or implicitly avoiding the interference, to the base station of the victim cell. In some embodiments of the disclosure, the management device may control the base station of the victim cell to hand over. A terminal of the victim cell may transmit a UL signal to the base station. In so doing, the base station may not successfully receive the UL signal, due to the atmospheric interference. The management device may transmit a control command to the base station, to hand the terminal of the victim cell over to another cell to minimize the effect of the atmospheric interference. The base station may transmit a handover command message to the terminal of which link quality is below a threshold on the aggressor cell. The terminal may hand over to a cell of at least one other carrier frequency.

In some other embodiments of the disclosure, the management device may change the DL-UL pattern of the victim cell. To reduce the UL scheduling area in the victim cell, the management device may change the DL-UL pattern in the flexible slot. The start of the UL symbol in the changed DL-UL pattern may be behind, in time, the start of the UL symbol of the original DL-UL pattern.

In some other embodiments of the disclosure, the management device may change a slot format of at least one terminal of the victim cell. The slot format may be dynamically configured at the terminal. The management device may change the slot format of at least one terminal (e.g., the terminal having the channel quality below the threshold) in the victim cell, by controlling the base station of the victim cell. The number of the UL symbols of the changed slot format may be smaller than the number of the UL symbols of the original slot format. By controlling the interference of some terminals individually affected by the atmospheric interference, the management device may efficiently avoid the interference on the victim cell.

In some other embodiments of the disclosure, the management device may control to set an additional UL carrier to the terminal of the victim cell. For example, the management device may transmit a control command to the base station to configure a supplementary uplink carrier (SUL) of the NR system on the victim cell. The base station may set the additional UL carrier besides the DL/UL carrier of the victim cell, to the terminal. The terminal may transmit UL traffic to the base station on the additional UL carrier. According to an embodiment of the disclosure, the base station may adaptively set the additional UL carrier based on a channel quality of the terminal. If the channel quality of the terminal falls below a threshold due to the atmospheric interference, the base station may set the additional UL carrier.

To facilitate the interference control of the disclosure, an interference control state may be defined. The interference control state may be defined per cell. The interference control state may be set for the aggressor cell or the victim cell. In some embodiments of the disclosure, the interference control state may indicate whether to control the interference of the cell. According to an embodiment of the disclosure, if the interference control state of the cell is 1, the management device may control the interference of the corresponding cell. For example, if the corresponding cell is the aggressor cell, the management device may limit the scheduling of the aggressor cell in the DL slot. For example, if the corresponding cell is the victim cell, the management device may control the base station of the victim cell to hand the victim cell over to another target cell in the UL slot. If the interference control state of the cell is 0, the management device may not control the interference of the corresponding cell.

In some other embodiments of the disclosure, the interference control state may indicate the interference control degree of the cell. A plurality of levels for the interference control is defined, and each level may be distinguished by the interference amount to sequentially mitigate or the avoidance degree. According to an embodiment of the disclosure, if the interference control state of the cell is a first level, the management device may not control the interference of the corresponding cell. If the interference control state of the cell is a second level, the management device may control the interference of the corresponding cell. For example, if the corresponding cell is the aggressor cell, the management device may limit the scheduling of one DL symbol. If the interference control state of the cell is a third level, the management device may perform an additional operation for the interference control of the corresponding cell. For example, if the corresponding cell is the aggressor cell, the management device may limit the scheduling of additional DL symbols after the one DL symbol.

Although not depicted in FIG. 7, the operations of FIG. 7 for determining whether to control the interference may be repeated.

In some embodiments of the disclosure, the management device may periodically perform the interference control operations of FIG. 7 according to a control period. Herein, the control period may be set independently from the measurement period of FIG. 5. The type of the interference control may be determined based on a length of the control period. For example, if the control period is longer than a reference period, the management device may change the antenna configuration of the base station, or change a direction of the antenna of the base station. For example, if the control period is shorter than the reference period, the management device may change the UL/DL configuration of the TDD frame, or dynamically change the DL-UL pattern of the TDD configuration information. In other words, the management device may determine whether to change long-term characteristics or short-term characteristics for the cell, according to the control period. For example, the relatively long-term characteristics may include the change of the antenna configuration, the DL-UL pattern setting by RRC, the UL/DL configuration change, and the SSF configuration change by RRC. The relatively short-term characteristics may include the DL scheduling, and the DL/UL symbol setting (e.g., dynamic TDD) in the slot by downlink control information (DCI). The management device may divide various interference control schemes into groups based on the period and manage an adequate group control scheme for the control period.

According to various embodiments of the disclosure, the management device may distinguish the type of the interference control operation of the aggressor cell, based on the period of determining the aggressor cell/victim cell (e.g., the procedure 403 of FIG. 4A, the aggressor cell/victim cell determining block 460 of FIG. 4B). For example, if determining the aggressor cell/victim cell or determining the interference control (e.g., operation 703 of FIG. 7) on a short period, the management device may perform the interference control operation which exerts relatively less effect on the network, such as DwPTS length reduction, scheduling abortion, the reduction of the allocated RBs. For example, if determining the aggressor cell/victim cell or determining the interference control (e.g., operation 703 of FIG. 7) on a relatively long period, the management device may perform the interference control operation which exerts relatively great effect on the network, such as antenna tilt control, power control, and azimuth control. For example, based on the determination period or the interference control period, the management device may identify at least one of the interference mitigation or avoidance operations. According to an embodiment of the disclosure, the groups of the interference control operations based on the effect on the network may be predefined.

In some other embodiments of the disclosure, the management device may perform the interference control operations of FIG. 7 in response to a specific event or request, that is, on demand.

The management device may control the interference by considering additional information besides the measurement result. For example, the management device may control the interference based on statistics information (e.g., aggressor cell/victim cell determination result, key performance indicator (KPI) information). For example, the management device may control the interference based on environment information (e.g., weather, climate, temperature, humidity, geography). For example, the management device may control the interference based on information instantaneously acquired (e.g., channel information). According to an embodiment of the disclosure, the control period may be set based on a period of acquiring the additional information.

Figure 8A:
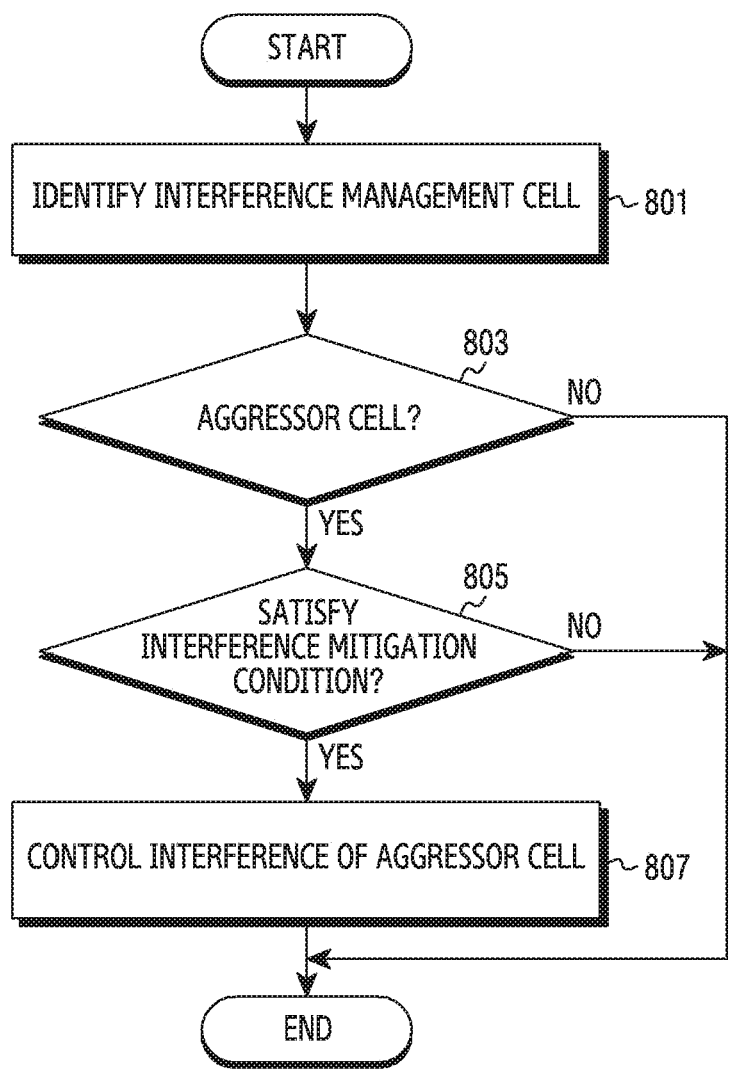
FIG. 8A illustrates a flowchart of a management device for controlling interference related to an aggressor cell in a wireless communication system according to an embodiment of the disclosure.

FIG. 8A illustrates a flowchart of a management device for controlling interference related to an aggressor cell in a wireless communication system according to an embodiment of the disclosure. The management device represents the management device 130 of FIG. 1.

Referring to FIG. 8A, in operation 801, the management device may identify an interference management cell. The interference management cell may indicate a cell used to determine whether to control the interference. The management device may identify at least one interference management cell among a plurality of cells, based on measurement results of the cells. Next, the management device may perform the interference control per interference management cell. The interference management cell may be the aggressor cell or the victim cell.

In operation 803, the management device may determine whether the interference management cell is the aggressor cell. If the interference management cell is the aggressor cell, the management device may perform operation 805. If the interference management cell is not the aggressor cell, the management device may finish the interference control.

In operation 805, the management device may determine whether an interference mitigation condition is satisfied. The management device may determine whether the aggressor cell satisfies the interference mitigation condition. The interference mitigation condition indicates a condition for determining whether it is necessary to mitigate the interference of the aggressor cell. The interference may be mitigated by limiting a signal of the aggressor cell all the time. However, it is efficient in the scheduling because signals of all the aggressor cells are limited, and the cell capacity may reduce because the coverage decreases excessively. Hence, the management device according to various embodiments needs to selectively mitigate the interference of the aggressor cell based on the interference mitigation condition.

In some embodiments of the disclosure, the management device may determine whether the interference mitigation condition is satisfied, based on the number of victim cells of the interference management cell. For example, the management device may determine that the interference mitigation condition is satisfied, if the number of the victim cells of the interference management cell exceeds X (X is a nonzero integer). By selectively mitigating the interference of the aggressor cell which interferes with many victim cells, unnecessary reduction of the DL capacity may be prevented. The threshold may be set for a different purpose if necessary. For example, the management device may set X to zero, wherein all the aggressor cells satisfy the interference mitigation condition. For example, the management device may set X to the number of the cells, to deactivate the interference mitigation of the aggressor cell.

In some other embodiments of the disclosure, the management device may determine whether the interference mitigation condition is satisfied, based on an interference amount of the interference management cell on the victim cells. The management device may obtain a measurement result from each base station. The measurement result may include interference information measured at the cell. The interference information may include interferer cell information and interference amount information. Based on the measurement result per cell, the management device may calculate a total interference amount of a particular cell on other aggressor cells. The management device may determine whether the interference mitigation condition is satisfied, based on the total interference amount of the interference management cell on other aggressor cell(s). For example, if the total interference amount exceeds a threshold, the management device may determine that the interference mitigation condition is satisfied. If the interference is selectively mitigated merely based on the number of the victim cells which suffer from the interference, the interference of the aggressor cell on a plurality of cells is controlled first and accordingly the interference of the aggressor cell which causes strong atmospheric interference may be mitigated later. To maximize the effect of the interference mitigation, it is necessary determine whether the interference mitigation condition is satisfied based on the interference amount of the victim cell of the interference management cell.

The management device may differently set an interference mitigation condition in changing the interference control state from ON to OFF and an interference mitigation condition in changing the interference control state from OFF to ON. In some embodiments of the disclosure, the management device may differently set a threshold for the number of the victim cells in changing the interference control state from ON to OFF and a threshold for the number of the victim cells in changing the interference control state from OFF to ON. For example, if the interference control state of the interference management cell is ON and the number of the victim cells of the interference management cell exceeds $A_1$ ($A_1$ is a nonzero integer), the management device may determine that the interference mitigation condition is satisfied. If the interference control state of the interference management cell is OFF and the number of the victim cells of the interference management cell falls below $A_2$ ($A_2$ is a nonzero integer), the management device may determine that the interference mitigation condition is not satisfied. The management device may set $A_1$ to be greater than $A_2$, by considering hysteresis to the thresholds $A_1$ and $A_2$ of the number of the victim cells. Thus, the management device may prevent frequent changes of the interference control state of the aggressor cell.

In some other embodiments of the disclosure, the management device may differently set a first threshold for the total interference amount of the aggressor cell on the victim cell(s) in changing the interference control state from ON to OFF and a second threshold for the total interference amount of the aggressor cell on the victim cell(s) in changing the interference control state from OFF to ON. For example, if the interference control state of the interference management cell is ON and the total interference amount exceeds $B_1$ dB, the management device may determine that the interference mitigation condition is satisfied. If the interference control state of the interference management cell is OFF and the total interference amount falls below $B_2$ dB, the management device may determine that the interference mitigation condition is not satisfied. Likewise, the management device may set $B_1$ to be greater than $B_2$, by considering hysteresis in the thresholds $B_1$ and $B_2$ of the total interference amount of the aggressor cell on the victim cell(s). Thus, the management device may prevent the interference control state of the aggressor cell from changing extremely frequently.

If the interference mitigation condition is satisfied, the management device may perform operation 807. If the interference mitigation condition is not satisfied, the management device may finish the interference control.

In operation 807, the management device may perform the interference control of the aggressor cell. The management device may control to mitigate the interference of the aggressor cell. The management device may reduce effect of a DL signal of the aggressor cell, to prevent the DL signal of the aggressor cell from coming into the UL resource duration of the victim cell. To reduce the effect of the DL signal, the management device may decrease the DL coverage of the aggressor cell or the resource area for transmitting the DL signal. Now, various schemes for mitigating the interference of the aggressor are described.

In some embodiments of the disclosure, the management device may change a resource configuration of the aggressor cell. The resource configuration may indicate a rate of the UL/DL component in the TDD communication system. For example, the resource configuration may include the TDD UL/DL configuration (e.g., Table 1) and the SSF configuration (e.g., Table 2) in the LTE communication system. For example, the management device may change to the SSF configuration (e.g., the SSF configuration #0) of the shorter DwPTS than the SSF configuration (e.g., the SSF configuration #3) of a current SSF. For example, the resource configuration may include the DL-UL pattern of the NR communication system. For example, the resource configuration may include the slot format of the NR communication system. The slot format may indicate a format according to rates of DL symbols and UL symbols in 14 symbols in one slot. According to the dynamic TDD, the base station may change the symbol rate of the flexible slots of at least one terminal.

In some other embodiments of the disclosure, the management device may control the power of the aggressor cell. The management device may lower a power threshold for the DL transmission at the base station of the aggressor ell. As the transmit power for the aggressor cell of the base station is lowered, the DL coverage of the aggressor cell reduces. As the DL coverage reduces, the DL signal of the aggressor cell may not reach the victim cell which is physically distant (e.g., tens or hundreds of km away)

In some other embodiments of the disclosure, the management device may change the antenna configuration of the aggressor cell. The antenna configuration may be an antenna configuration for radiating the DL signal. The antenna configuration may include the number of antennas, and antenna direction (e.g., azimuth) setting. For example, the management device may control the base station of the aggressor cell to decrease the number of the antennas or to lower the antenna direction. As the DL coverage reduces, the DL signal of the aggressor cell may not physically reach the victim cell.

In some other embodiments of the disclosure, the management device may change the scheduling of the aggressor cell. The management device may limit the scheduling or reduce the whole resource area scheduled in the DL time duration of the aggressor cell. For example, the management device may reduce the scheduling of the last E-ary symbol(s) in the DL time duration. Since the last DL symbol of the DL time duration is relatively closest to the start symbol of the UL resource area in the TDD resource structure, the signal of the DL symbol is mostly likely to come into the UL resource area of the victim cell. For example, the management device may set the frequency area of the E-ary symbols to minimum (e.g., 6 PRBs). For example, the management device may not perform the DL scheduling on the E-ary symbols.

In some other embodiments of the disclosure, the management device may abort the scheduling of the aggressor cell. If the aggressor cell interferes with a plurality of victim cells and its interference amount is considerable, the management device may reduce the interference on the victim cell, by aborting the scheduling of the aggressor cell.

Figure 8B:
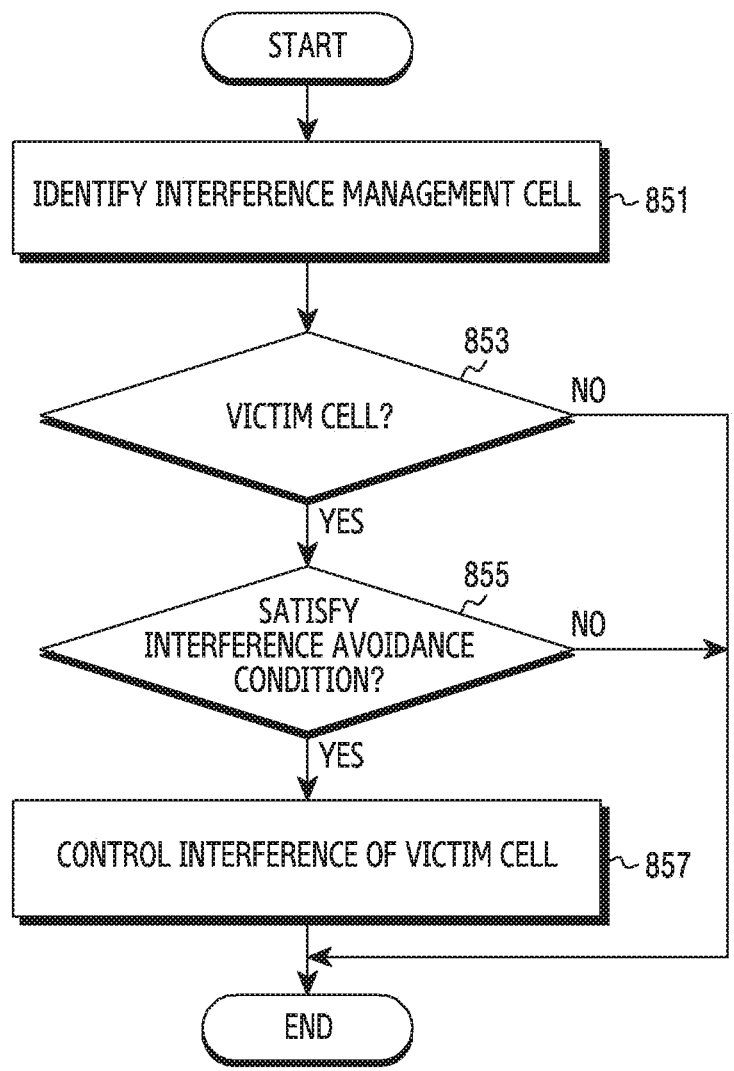
FIG. 8B illustrates a flowchart of a management device for controlling interference related to a victim cell in a wireless communication system according to an embodiment of the disclosure.

FIG. 8B illustrates a flowchart of a management device for controlling interference related to a victim cell in a wireless communication system according to an embodiment of the disclosure. The management device represents the management device 130 of FIG. 1.

Referring to FIG. 8B, in operation 851, the management device may identify the interference management cell. The management device may identify at least one interference management cell among a plurality of cells, based on measurement results of the cells. Operation 851 corresponds to operation 801 of FIG. 8A, and accordingly its identical and similar descriptions may be omitted.

In operation 853, the management device may determine whether the interference management cell is the victim cell. If the interference management cell is the victim cell, the management device may perform operation 855. If the interference management cell is not the aggressor cell, the management device may finish the interference control.

In operation 855, the management device may determine whether an interference avoidance condition is satisfied. The management device may determine whether the victim cell satisfies the interference avoidance condition. The interference avoidance condition indicates a condition for determining whether it is necessary to avoid the interference of the victim cell. The effect of the atmospheric interference may be avoided by limiting the UL scheduling or avoiding the interference of the victim cell, such as handover. However, handing over all the victim cells or limiting the scheduling not only causes the unnecessary handover but also excessively reduces the cell capacity of the victim cell. Thus, the management device according to various embodiments needs to selectively avoid the interference of the victim cell based on the interference avoidance condition.

In some embodiments of the disclosure, the management device may determine whether the interference avoidance condition is satisfied, based on the number of aggressor cells of the interference management cell. For example, if the number of the aggressor cells of the interference management cell exceeds Y (Y is a nonzero integer), the management device may determine that the interference avoidance condition is satisfied. By selectively avoiding the interference on the victim cell which is interfered by many aggressor cells, unnecessary reduction of the UL capacity may be prevented. The threshold may be set for a different purpose if necessary. For example, the management device may set Y to zero, wherein all the victim cells satisfy the interference avoidance condition. For example, the management device may set Y to the number of the entire cells, to deactivate the interference avoidance of the victim cell.

In some other embodiments of the disclosure, the management device may determine whether the interference avoidance condition is satisfied, based on the interference amount of the interference management cell from the aggressor cells. The management device may obtain a measurement result from each base station. The measurement result may include the interference information measured at the cell. The interference information may include the interferer cell information and the interference amount information. Based on the measurement result per cell, the management device may calculate a total interference amount of a particular cell from another aggressor cells. The management device may determine whether the interference avoidance condition is satisfied, based on the total interference amount of the interference management cell from another aggressor cell(s). For example, if the total interference amount exceeds the threshold, the management device may determine that the interference avoidance condition is satisfied. If the interference is selectively avoided merely based on the number of the aggressor cells which cause the interference, the interference of the victim cell suffering from a plurality of cells is controlled first and accordingly the interference of the victim cell which suffers from strong interference may be avoided later. To maximize the effect of the interference avoidance, it is necessary determine whether the interference avoidance condition is satisfied based on the interference amount of the aggressor cell of the interference management cell.

In some other embodiments of the disclosure, the management device may determine whether the interference avoidance condition is satisfied, according to whether there is atmospheric interference in the interference management cell.

If the interference of the aggressor cell is controlled, the atmospheric interference does not exist on the victim cell or its amount may decrease. Hence, it may be unnecessary to determine whether to avoid the interference, merely based on the number of the aggressor cells or the interference amount of the aggressor cell. Thus, the management device may determine whether the interference avoidance condition is satisfied, based on the presence or absence of the atmospheric interference in the UL symbol area of the interference management cell. For example, the management device may identify the latest measurement result of the victim cell. If the atmospheric interference exists in the victim cell, the management device may determine that the interference avoidance condition is satisfied. For example, the management device may request the victim cell to measure the atmospheric interference. The management device may receive the measurement result of the atmospheric interference from the victim cell. If the atmospheric interference exists in the victim cell, the management device may determine that the interference avoidance condition is satisfied. For example, the management device may obtain an atmospheric interference amount of the victim cell from the latest measurement result of the victim cell. If the atmospheric interference amount exceeds a threshold, the management device may determine that the interference avoidance condition is satisfied. The management device may reduce the unnecessary victim cell interference control, by considering the atmospheric interference amount.

The management device may differently set an interference avoidance condition in changing the interference control state from ON to OFF and an interference avoidance condition in changing the interference control state from OFF to ON. In some embodiments of the disclosure, the management device may differently set a threshold for the number of the aggressor cells in changing the interference control state from ON to OFF and a threshold for the number of the aggressor cells in changing the interference control state from OFF to ON. For example, if the interference control state of the interference management cell is ON and the number of the aggressor cells of the interference management cell exceeds $C_1$ ($C_1$ is a nonzero integer), the management device may determine that the interference avoidance condition is satisfied. If the interference control state of the interference management cell is OFF and the number of the aggressor cells of the interference management cell falls below $C_2$ ($C_2$ is a nonzero integer), the management device may determine that the avoidance mitigation condition is not satisfied. The management device may set $C_1$ to be greater than $C_2$, by considering hysteresis in the thresholds $C_1$ and $C_2$ of the number of the victim cells. Thus, the management device may prevent excessively frequent changes of the interference control state of the victim cell.

In some other embodiments of the disclosure, the management device may differently set a first threshold for the total interference amount of the victim cell caused by the aggressor cell(s) in changing the interference control state from ON to OFF and a second threshold for the total interference amount of the victim cell caused by the aggressor cell(s) in changing the interference control state from OFF to ON. For example, if the interference control state of the interference management cell is ON and the total interference amount exceeds $D_1$ dB, the management device may determine that the interference avoidance condition is satisfied. If the interference control state of the interference management cell is OFF and the total interference amount falls below $D_2$ dB, the management device may determine that the interference avoidance condition is not satisfied. Likewise, the management device may set $D_1$ to be greater than $D_2$, by considering hysteresis in the thresholds $D_1$ and $D_2$ of the total interference amount of the victim cell caused from the aggressor cell. Thus, the management device may prevent the interference control state of the victim cell from changing extremely frequently.

If the interference avoidance condition is satisfied, the management device may perform operation 857. If the interference avoidance condition is not satisfied, the management device may finish the interference control.

In operation 857, the management device may perform the interference control of the victim cell. The management device may control to mitigate the interference of the victim cell. To prevent the DL signal of the aggressor cell from affecting the UL transmission of the victim cell, the management device may change the state of the victim cell. Now, various schemes for avoiding the interference of the victim cell are described.

In some embodiments of the disclosure, the management device may hand over the terminal of the victim cell. The management device may transmit a control command to the base station of the victim cell. The control command may be a control message for the base station of the victim cell to transmit a handover command to the terminal in the cell. According to an embodiment of the disclosure, the base station may transmit the handover command to the terminal of which the channel quality falls below a threshold, among terminals of the victim cell. According to an embodiment of the disclosure, the management device may transmit the handover message to the terminal in ascending order of the channel quality. Thus, the base station may gradually lessen the effect from the interfering cell. The terminal may hand over from the victim cell to a target cell of at least one other operating frequency, under the control of the base station. According to an embodiment of the disclosure, the management device may adjust parameters for determining whether to hand over. The management device may adjust at least one parameter value related to the handover of the victim cell, rather than explicitly forcing the handover of the victim cell, so as to relatively facilitate the handover in cell boundaries of the victim cell.

In some other embodiments of the disclosure, the management device may reduce UL scheduling of the victim cell. The management device may reduce the effect of the atmospheric interference by decreasing the UL scheduling of the victim cell. According to an embodiment of the disclosure, the management device may block scheduling of N-ary UL symbol(s). For example, in the LTE communication system, the management device may block the scheduling of first N-ary symbol(s) of the first UL subframe after the SSF. For example, in the NR communication system, the management device may block the scheduling of first N-ary symbol(s) of the UL slot. According to an embodiment of the disclosure, the management device may reduce a scheduling area on the frequency domain during the UL symbol(s). For example, the management device may lessen the effect of the management device, by reducing the number of PRBs allocated to the terminal of the victim cell. The management device may control the base station to selectively reduce the scheduling, according to the channel quality of the terminal. The management device may transmit an adaptive scheduling command to the base station. The base station may obtain the channel quality of each terminal, and limit the UL scheduling of the terminal in the ascending order of the channel quality.

In some other embodiments of the disclosure, the management device may change the DL-UL pattern of the victim cell. The DL-UL pattern of the NR communication system may be set by RRC signaling. The management device may flexibly change the DL-UL pattern of the victim cell. The management device may change the DL-UL pattern, so as to lengthen the difference between the end part of the DL time duration and the beginning part of the UL time duration in the current DL-UL pattern of the victim cell.

In some other embodiments of the disclosure, the management device may dynamically change the slot format of the terminal of the victim cell. The slot format may indicate a combination of the DL symbol-flexible symbol-UL symbol of the symbols of the flexible slot. The management device may transmit a dynamic TDD command to the base station of the victim cell. The base station may change the slot format by transmitting DCI (e.g., DCI format 2_0) to at least one terminal. The base station may selectively control the terminal of the low channel quality. The base station may transmit the DCI to the terminal, to allocate the UL time duration further behind in the configuration period of the DL-UL pattern.

In some other embodiments of the disclosure, the management device may set an additional UL carrier for the terminal of the victim cell. The additional UL carrier may be SUL. The management device may control the base station of the victim cell to set the additional carrier for at least one terminal, to address UL traffic in the victim cell. The management device may identify at least one terminal of which the channel quality is lowered due to the atmospheric interference. By setting the additional UL carrier to the identified terminal, the base station may lessen the effect of the atmospheric interference. The terminal may perform UL transmission over the additional UL carrier, and the effect of the interference may reduce because the additional UL carrier is a different frequency from the DL carrier transmitting the atmospheric interference.

In some other embodiments of the disclosure, the management device may control the victim cell to decode the UL signal only in some symbol area. The base station of the victim cell may perform channel decoding, while decreasing or removing a weight of at least one UL symbol including the atmospheric interference in the UL time duration. In other words, the base station of the victim cell may obtain a detection result, by decoding the received UL signal in the symbol area of no atmospheric interference. The atmospheric interference of the UL symbol area may be positioned in the beginning part of the UL time duration.

In some other embodiments of the disclosure, the management device may perform beam management in the victim cell. The interference direction may be identified according to the physical positions of the aggressor cell and the victim cell. The management device may control not to use a beam close to the direction of the aggressor cell, among beams (e.g., receive beams) of the victim cell or beams (e.g., transmit beams) of the terminal in the victim cell.

The base station of the victim cell may identify beam information corresponding to the interference direction. The beam information may be indicated by the DL resource (e.g., CSI-RS resource indicator (CRI), SSB resource indicator (SSBRI)). According to an embodiment of the disclosure, the base station of the victim cell may limit the scheduling of its serviced terminals based on the beam information. For example, the base station of the victim cell may selectively control the interference of the terminal affected by the atmospheric interference.

According to an embodiment of the disclosure, the base station of the victim cell may control not to use the transmit beam of the terminal associated with the beam information corresponding to the interference direction. For example, the terminal may perform UL beam search using a plurality of beams. The terminal may transmit UL signals over the beams respectively. The base station may measure the channel quality of the received UL signals, and feed back an optimal beam. In so doing, the base station may feed back the beam identified by considering the interference direction, rather than feeding back the SRS resource of the optimal channel quality.

For example, in the NR communication system, the terminal may perform the beam search using SRSs. The base station may feed the beam information (e.g., SRS resource indicator (SRI)) back to the terminal through the DCI. The base station may identify the optimal beam, based on the interference direction and direction information of the received SRSs. In the beam search, the UL signal may be repeatedly transmitted in a specific duration by changing the beam. Since the signal is transmitted in the specific duration, it is not easy to reflect the effect of the atmospheric interference in the beam search. Thus, the base station of the victim cell may identify the direction of the atmospheric interference, and exclude some SRSs from the feedback target based on the identified direction. Since the transmit beam of the terminal is identified by considering the effect of the atmospheric interference, the UL communication may be protected fundamentally from the effect of the atmospheric interference.

While the interference control of the aggressor cell has been described in FIG. 8A and the interference control of the victim cell has been described in FIG. 8B, the particular cell may be the aggressor cell and the victim cell. Accordingly, according to various embodiments of the disclosure, the management device may determine whether both the interference mitigation condition and the interference avoidance condition are satisfied for the interference management cell. The embodiment of FIG. 8A and the embodiment of FIG. 8A may be fulfilled in combination.

Figure 9:
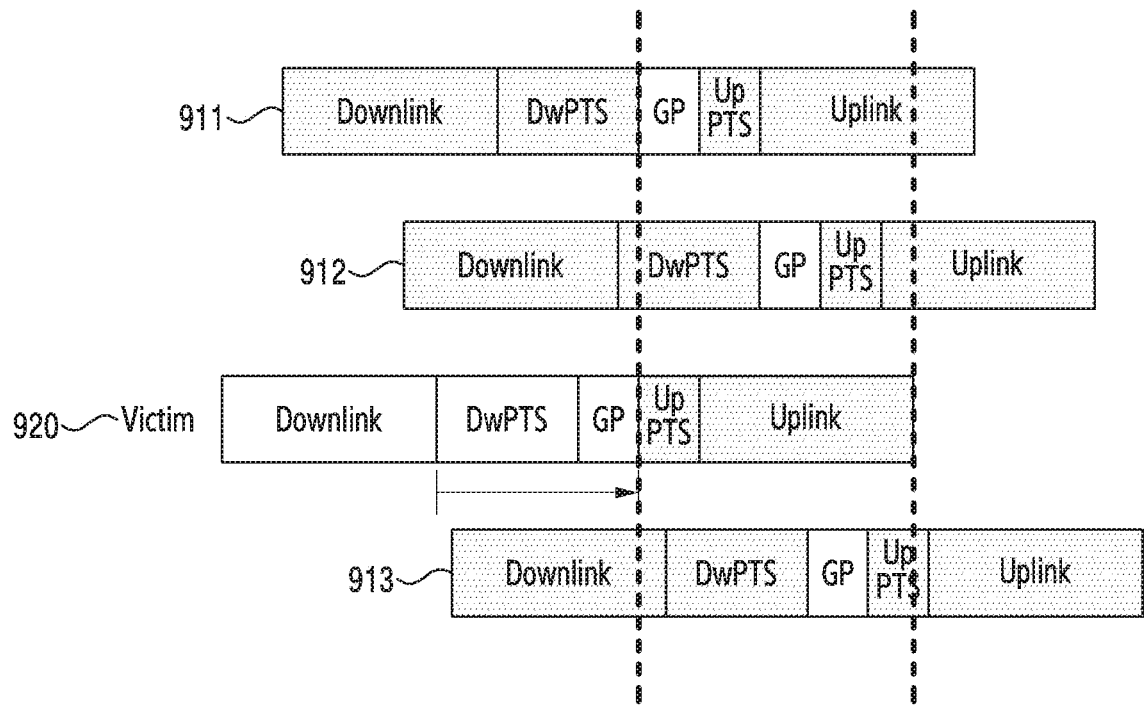
FIG. 9 illustrates an interference effect based on a distance in a wireless communication system according to an embodiment of the disclosure.

FIG. 9 illustrates an interference effect based on a distance in a wireless communication system according to an embodiment of the disclosure. The interference may be the atmospheric interference. The LTE TDD communication system is described by way of example to explain the effect based on the distance in FIG. 9, but it should be noted that the corresponding descriptions are true for the TDD communication of at least one other communication system. The descriptions of FIG. 9 are true for the NR TDD communication system.

Referring to FIG. 9, a network may include a first cell 911, a second cell 912, a third cell 913, and a measurement cell 920. It is assumed that those cells have the identical UL/DL configuration and SSF configuration. The SSF configuration may be the SSF configuration #7 of Table 2. A length ratio of DwPTS:GP:UpPTS may be 10:2:2. A base station of the first cell 911 may be distant from a base station of the measurement cell 920 by $d_1$. A DL signal transmitted in the DwPTS of the first cell 911 may not flow into the UL symbol area (symbols of the UpPTS and symbols of UL subframe) of the measurement cell 920. The base station of the measurement cell 920 may not measure the DL signal of the first cell 911. The first cell 911 is not an aggressor cell of the measurement cell 920.

A base station of the second cell 912 may be distant from the base station of the measurement cell 920 by $d_2$. $d_2$ may be greater than $d_1$. Hence, propagation delay of the second cell 912 may be greater than propagation delay of the first cell 911. Due to the greater propagation delay, a time for transmitting the DL signal may be delayed as well. A resource structure of the second cell 912 may be moved on the time domain by the propagation delay difference corresponding to $d_2-d_1$ from a resource structure of the first cell 911. A DL signal transmitted in the DwPTS of the second cell 912 may come into the UL symbol area (the symbols of the UpPTS and the symbols of the UL subframe) of the measurement cell 920. The base station of the measurement cell 920 may measure the DL signal of the second cell 912, and thus generate a measurement result of the atmospheric interference. The second cell 912 is the aggressor cell of the measurement cell 920. The measurement cell 920 is a victim cell of the second cell 912. According to an embodiment of the disclosure, the management device may limit DL scheduling in the DwPTS of the second cell 912.

A base station of the third cell 913 may be distant from the base station of the measurement cell 920 by $d_3$. $d_3$ may be greater than $d_2$. Accordingly, propagation delay of the third cell 913 may be greater than the propagation delay of the second cell 912. Due to the greater propagation delay, a time for transmitting the DL signal may be delayed as well. A resource structure of the third cell 913 may be moved on the time domain by the propagation delay difference corresponding to $d_3$–$d_2$ from the resource structure of the second cell 912. A DL signal transmitted in the DwPTS of the third cell 913 may come into the UL symbol area (the symbols of the UpPTS and the symbols of the UL subframe) of the measurement cell 920. The base station of the measurement cell 920 may measure the DL signal of the third cell 913, and thus generate a measurement result of the atmospheric interference. The third cell 913 is the aggressor cell of the measurement cell 920. The measurement cell 920 is a victim cell of the third cell 913. Although the management device limits DL scheduling in the DwPTS of the third cell 913, the atmospheric interference may still exist. This is because the DL signal in the DL subframe comes into not only the DwPTS of the third cell 913 but also the UL symbol area of the measurement cell 920. Hence, the management device may require additional interference control for the third cell 913. In the following, specific examples for the additional interference control based on distance information are provided in FIG. 10.

Figure 10:
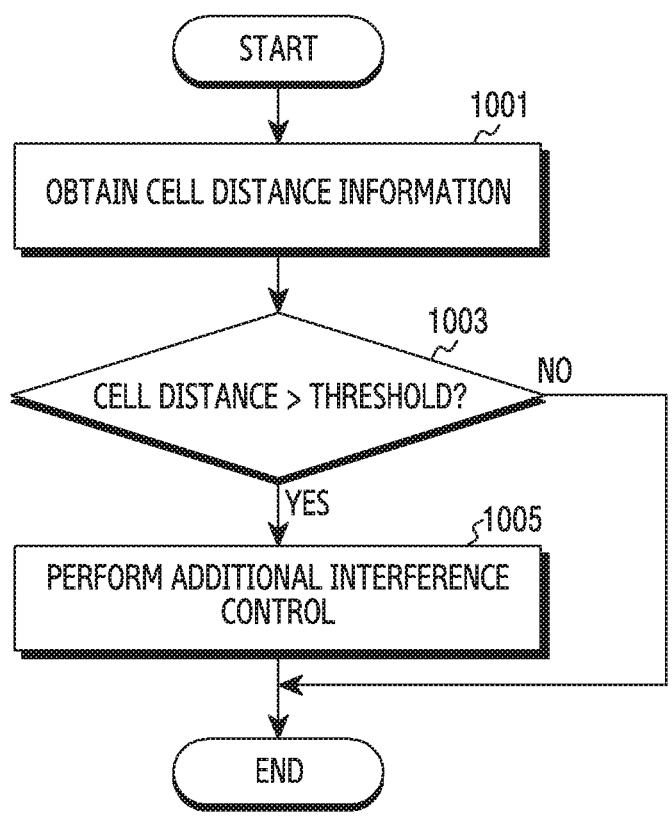
FIG. 10 illustrates a flowchart of a management device for controlling interference based on a distance in a wireless communication system according to an embodiment of the disclosure.

FIG. 10 illustrates a flowchart of a management device for controlling interference based on a distance in a wireless communication system according to an embodiment of the disclosure. The management device represents the management device 130 of FIG. 1. The interference control of FIG. 10 is interference control additionally performed if the interference mitigation of FIG. 8A and the interference avoidance of FIG. 8B is fulfilled.

Referring to FIG. 10, the management device may obtain cell distance information in operation 1001. The cell distance information may be related to a distance between an interferer cell which causes the atmospheric interference, that is, the aggressor cell and a cell which measures the atmospheric interference, that is, the victim cell. According to an embodiment of the disclosure, the management device may obtain the cell distance information of the aggressor cell-victim cell based on a measurement result of each cell. For example, the base station of the measurement cell may determine the cell distance information, based on the difference between the end part (e.g., m of FIG. 5) of the atmospheric interference measured in the UL symbol area and the beginning part of the DwPTS. According to another embodiment of the disclosure, the management device may obtain the cell distance information, based on location information per base station obtained from a management server. The management device may identify an ID of the aggressor cell and an ID of the victim cell, and determine a physical location difference between the two cells based on preconfigured location information. Based on the location difference, the management device may obtain the cell distance information. According to yet another embodiment of the disclosure, the management device may obtain the cell distance information, based on a time difference of a symbol transmitting a predefined sequence and a symbol receiving the sequence. The management device may obtain sequence resource information per cell, and identify the symbol location of the actually received sequence. Based on the difference of the transmit symbol and the received symbol, the management device may obtain the cell distance information. For example, a distance for transmitting the signal, corresponding to 14 symbols, may be 300 km. Hence, if the symbol distance is 14 symbols, the management device may calculate actual cell distance information as 300 km.

In operation 1003, the management device may determine whether the cell distance exceeds a threshold. The management device may determine the distance between the aggressor cell and the victim cell, from the cell distance information. The management device may specify the aggressor cell. The management device may specify the victim cell. The management device may identify the distance between the aggressor cell and the victim cell, that is, the cell distance. If the cell distance exceeds the threshold, the management device may perform operation 1005. If the cell distance falls below the threshold, the management device may finish the additional interference control. If the cell distance is below the threshold, the atmospheric interference is fully mitigated with the existing interference control.

In operation 1005, the management device may perform the additional interference control. If the cell distance exceeds the threshold, the management device may set the additional interference control state of the aggressor cell and the additional interference control state of the victim cell to ON.

In some embodiments of the disclosure, the management device may perform additional interference mitigation of the aggressor cell. For example, if limiting the scheduling of the DwPTS of the aggressor cell, the management device may also limit the scheduling of the DL frame before the DwPTS of the aggressor cell. For example, the management device may limit not only the transmit power in the DwPTS of the aggressor cell but also the transmit power in the DL subframe. For example, if the antenna tilt of the aggressor cell is lowered by 10 degrees, the management device may further lower the antenna tilt to 20 degrees. For example, the coverage may be further reduced for the additional atmospheric interference mitigation. For example, if the frequency scheduling area of the aggressor cell is adjusted to $W_1$-ary ($W_1$ is a natural number) PRBs, the management device may further decrease the frequency scheduling area of the aggressor cell to $W_2$-ary ($W_2$ is an integer, $W_1 < W_2$) PRBs. For example, the management device may abort the scheduling.

In some other embodiments of the disclosure, the management device may perform additional interference avoidance of the victim cell. For example, if scheduling of first $N_1$-ary symbols is limited in the UL slot of the victim cell, the management device may further limit the scheduling of $N_2$-ary symbols following the $N_1$-ary symbols. For example, the management device may control the base station of the victim cell to additionally transmit the DCI. The DCI additionally transmitted may indicate a slot format of the shorter UL symbol area than the slot format indicated by the previously transmitted DCI. For example, the effect of the atmospheric interference of the aggressor cell distant far may be reduced, by decreasing the UL symbol length in the flexible slot.

In FIG. 10, whether to perform the additional interference control is determined merely with one threshold. However, the additional interference control may be defined, and the management device may differently set an additional interference control condition in changing the additional interference control state from ON to OFF and an additional interference control condition in changing the additional interference control state from OFF to ON.

According to various embodiments of the disclosure, the management device may manage the additional interference control state of the aggressor cell. In some embodiments of the disclosure, if the additional interference control state of the aggressor cell is OFF and the number of victim cells which are distant from the aggressor cell over a threshold exceeds $T_1$ ($T_1$ is a non-negative integer), the management device may set the additional interference control to ON. The management device may perform procedures for the additional interference mitigation of the aggressor cell. If the additional interference control state of the aggressor cell is ON and the number of victim cells which are distant from the aggressor cell below the threshold falls below $T_2$ ($T_2$ is a non-negative integer), the management device may set the additional interference control to OFF. The management device may perform the procedures for the additional interference mitigation of the aggressor cell. According to an embodiment of the disclosure, $T_2$ may be set to a smaller value than $T_1$ to reduce the ping-pong which frequently changes the additional interference control state of the aggressor cell.

In some embodiments of the disclosure, if the additional interference control state of the aggressor cell is OFF and the interference amount of the aggressor cell on the victim cells which are distant from the aggressor cell over the threshold exceeds a first threshold, the management device may set the additional interference control state to ON. The management device may perform the procedures for the additional interference mitigation of the aggressor cell. If the additional interference control state of the aggressor cell is ON and the interference amount of the aggressor cell on the victim cells which are distant from the aggressor cell over the threshold falls below a second threshold, the management device may set the additional interference control state to OFF. The management device may perform the procedures for the additional interference mitigation of the aggressor cell. According to an embodiment of the disclosure, by considering the hysteresis characteristic, the second threshold may be set to a smaller value than the first threshold.

According to various embodiments of the disclosure, the management device may manage the additional interference control state of the victim cell. In some embodiments of the disclosure, if the additional interference control state of the victim cell is OFF and the number of aggressor cells which are distant from the victim cell over the threshold exceeds $t_1$ ($t_1$ is a non-negative integer), the management device may set the additional interference control to ON. The management device may perform the procedures for the additional interference mitigation of the victim cell. If the additional interference control state of the victim cell is ON and the number of aggressor cells which are distant from the victim cell over the threshold falls below $t_2$ ($t_2$ is a non-negative integer), the management device may set the additional interference control to OFF. The management device may perform procedures for the additional interference avoidance of the victim cell. According to an embodiment of the disclosure, $t_2$ may be set to a smaller value than $t_1$ to reduce the ping-pong which repeats the handover of the victim cell.

In some embodiments of the disclosure, if the additional interference control state of the victim cell is OFF and the interference amount of the victim cell from the aggressor cells which are distant beyond the threshold exceeds a third threshold, the management device may set the additional interference control state to ON. The management device may perform the procedures for the additional interference avoidance of the victim cell. If the additional interference control state of the victim cell is ON and the interference amount of the victim cell from the aggressor cells which are distant beyond the threshold falls below a fourth threshold, the management device may set the additional interference control state to OFF. The management device may perform the procedures for the additional interference avoidance of the victim cell. According to an embodiment of the disclosure, by considering the hysteresis characteristic, the fourth threshold may be set to a smaller value than the third threshold.

Namely, the management device may more effectively manage the effect of the atmospheric interference, by conducting the additional interference control on the cells of the great cell distance among the aggressor cells or the victim cells. According to an embodiment of the disclosure, aspects of the interference control of the aggressor cell may be configured as shown in Table 4.

TABLE 4

| | Aggressor interference control state = 0 | Aggressor interference control state = 1 | Aggressor additional interference control state = 0 | Aggressor additional interference control state = 1 |
|---|---|---|---|---|
| ex 1 | DwPTS length maintain (SSF #7) | DwPTS length reduction (SSF #5) | DL subframe scheduling allowance | DL subframe scheduling interruption |
| ex 2 | DwPTS scheduling allowance | DwPTS scheduling interruption | DL subframe scheduling allowance | DL subframe scheduling interruption |
| ex 3 | DwPTS length maintain (SSF #7) | DwPTS length reduction (SSF #5) | DL transmission power maintain | DL transmission power reduction |

If the interference control state is 0, the interference control is not performed. For example, the interference control state of the aggressor cell is OFF. If the interference control state is 1, the interference control is performed. For example, the interference control state of the aggressor cell is ON. The management device may perform the interference mitigation of the aggressor cell. If the additional interference control state is 0, the additional interference control is not performed. For example, the additional interference control state of the aggressor cell is OFF. If the additional interference control state is 1, the additional interference control is performed. For example, the additional interference control state of the aggressor cell is ON. The management device may perform the additional interference mitigation of the aggressor cell. While the interference control for the additional interference mitigation limits the scheduling of the DL subframe or reduces the DL transmit power in Table 4, it is noted that other interference mitigation operation may be defined as the additional interference mitigation. For example, the interference mitigation may change the SSF configuration, and the additional interference mitigation may change the antenna configuration. For example, the interference mitigation may change the UL/DL configuration, and the additional interference mitigation may restrict the scheduling of the DL subframe.

While two states are defined based on the single threshold according to whether the cell distance exceeds (or is greater than) the threshold in FIG. 10, two or more interference control states may be defined. For example, three interference control states may be defined, and the management device may identify the interference control state corresponding to the cell distance among the interference control states. The interference control states each may be a control state for the aggressor cell to gradually mitigate the atmospheric interference, or a control state for the victim cell to gradually avoid the atmospheric interference. For example, if the cell distance is a first level, the management device may limit the scheduling of one UL symbol of the victim cell. If the cell distance is a second level, the management device may limit the scheduling of two UL symbols of the victim cell. If the cell distance is an N level, the management device may limit the scheduling of N-ary UL symbols of the victim cell. For example, if the cell distance is the first level, the management device may decrease the number of the DL slots by one in the DL-UL pattern of the aggressor cell. If the cell distance is the second level, the management device may decrease the number of the DL slots by two in the DL-UL pattern of the aggressor cell. If the cell distance is the N level, the management device may decrease the number of the DL slots by N in the DL-UL pattern of the aggressor cell.

The interference of the aggressor cell is controlled, and the additional interference control is performed on the aggressor cell if the distance exceeds the threshold in FIG. 10, but various embodiments of the disclosure are not limited thereto. In some embodiments of the disclosure, the management device may perform only the interference mitigation of the aggressor cell if the cell distance falls below the threshold, and may perform both of the interference mitigation of the aggressor cell and the interference avoidance of the victim cell if the cell distance exceeds the threshold. In some other embodiments of the disclosure, the management device may perform only the interference avoidance of the victim cell if the cell distance falls below the threshold, and may perform both of the interference mitigation of the aggressor cell and the interference avoidance of the victim cell if the cell distance exceeds the threshold.

The adaptive interference control according to various embodiments of the disclosure may be conducted based on the interference measurement result of the victim cell. If the aggressor cell and the victim cell are determined and the interference mitigation is conducted, the effect of the interference mitigation may not be reflected. Hence, the adaptive interference control may be performed by observing the interference measurement result of the victim cell after the interference mitigation, that is, after the DL interference control. The management device may adjust the rate of the cells of which the interference control state of the aggressor cell is ON. After determining the interference control and controlling the interference, each cell may measure the atmospheric interference. According to the interference measurement result, the rate of the cell for the additional interference mitigation (DL interference control) may be increased or decreased.

The adaptive interference according to various embodiments of the disclosure may include three procedures. In the first procedure, each cell may measure the interference. The interference measurement result of each cell may be provided to the management device including the interference determining block. The measurement result may include UL channel quality information, such as MCS or BLER, besides the atmospheric interference.

The second procedure 403 may allocate priorities to the aggressor cells of each victim cell. For example, the priority may be determined in descending order of the interference amount on the victim cell. For example, the priority may be determined in descending order of the interference amount on all the victim cells. For example, the priority may be determined in descending order of the total number of the victim cells.

The third procedure 405 may adjust the cell rate. If the interference measurement result of the victim cell does not satisfy a reference value (i.e., if the atmospheric interference exceeds a specific threshold, or if the UL quality does not reach a specific reference value), the number or the rate of the DL interference control cells for the victim cell may increase. Conversely, the number or the rate of the DL interference control cells for the victim cell may decrease. If the number or the rate of the cells changes, the order of the included aggressor cell may conform to the priority of the second procedure. Herein, the change rate may vary per victim cell.

The adaptive interference control of the disclosure may be performed continuously. For example, the three procedures may be repeated. Now, operations of each entity for the adaptive interference control are explained in FIG. 11.

Figure 11:
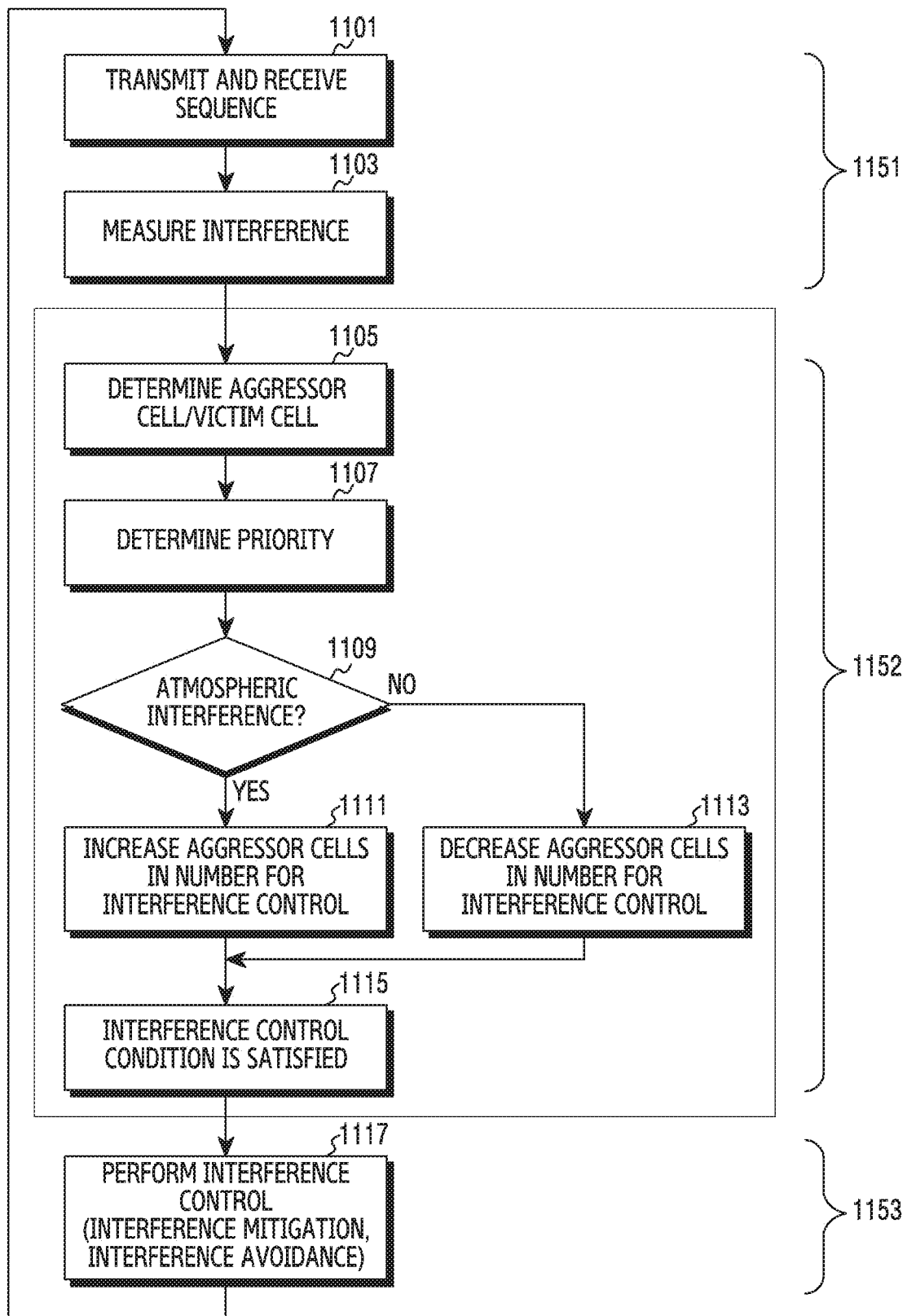
FIG. 11 illustrates a flowchart for adaptive interference control in a wireless communication system according to an embodiment of the disclosure.

FIG. 11 illustrates a flowchart for adaptive interference control in a wireless communication system according to an embodiment of the disclosure. Some of operations of FIG. 11 may be fulfilled by a management device (e.g., the management device 130 of FIG. 1), and other some of operations of FIG. 11 may be fulfilled by an individual cell (e.g., the base station 110 and 120 of FIG. 1). The management device may be a central unit connected to each cell.

Referring to FIG. 11, operations 1101 and 1103 may be performed at a base station of each cell. Operations 1101 and 1103 may be referred to as an interference measurement procedure 1151. In operation 1101, each cell may transmit and receive a sequence. A type of the sequence and a resource of the sequence may be defined based on the cell. Since the type of the sequence and the resource of the sequence are cell-specific, other cell may identify the cell which transmits the sequence.

In operation 1103, each cell may measure interference. The base station of the cell may measure a DL signal transmitted from another cell, in the UL symbol area.

Operation 1105 through 1115 may be performed at the management device connected to each cell. The management device may manage the adaptive interference control, by collecting information from each cell. Operation 1105 through 1115 may be referred to as an interference management procedure 1152. In operation 1105, the management device may determine an aggressor cell and/or a victim cell. The management device may identify at least one aggressor cell among the interference-measured cells. The management device may identify at least one victim cell among the interference-measured cells.

In operation 1107, the management device may determine a priority. Herein, the priority may be determined per victim cell. The priority may be defined for at least one aggressor cell which affects the victim cell. For example, the priority may be determined for each of the aggressor cells of the victim cell.

In operation 1109, the management device may determine whether atmospheric interference exists. The management device may perform operation 1111 in response to the presence of the atmospheric interference. The management device may perform operation 1113 in response to the absence of the atmospheric interference.

In operation 1111, the management device may increase the number of the aggressor cells for the interference management. For example, the management device may add a change delta d to the number of the existing aggressor cells, and thus adjust the number A+d of the aggressor cells. Unlike FIG. 11, the management device may decrease the rate of the aggressor cells among the total cells, rather than the number of the aggressor cells. Since the atmospheric interference still exists, the effect of the atmospheric interference in the network may be lessened by increasing the rate of the aggressor cells for the interference mitigation.

In operation 1113, the management device may decrease the number of the aggressor cells for the interference management. For example, the management device may subtract the change delta d from the number of the existing aggressor cells, and thus adjust the number A-d of the aggressor cells. Unlike FIG. 11, the management device may decrease the rate of the aggressor cells among the total cells, rather than the number of the aggressor cells. Since the atmospheric interference reduces, efficiency in the network may be raised by increasing the rate of the aggressor cells for the interference mitigation.

In operation 1115, the management device may determine that an interference control condition is satisfied. For example, the management device may determine to control the interference of a corresponding cell. For example, the management device may determine whether the aggressor cell satisfies the interference mitigation condition. For example, the management device may determine whether the victim cell satisfies the interference avoidance condition.

Operation 1117 may be performed at each cell. Operation 1117 may be referred to as an interference management procedure 1153. The interference control of operation 1117 may be executed at each cell according to the control of the management device. In operation 1117, the base station of each cell may perform the interference control. The base station of the aggressor cell may conduct the DL interference control. For example, the base station of the aggressor cell may perform the interference mitigation. The base station of the victim cell may conduct the UL interference control. For example, the base station of the victim cell may perform the interference avoidance.

After operation 1117, the management device may return to operation 1111. For example, each cell and the management device may periodically perform the interference control operations. By repeating the interference control operations, the effect of the interference control may be reflected, to thus maximize the interference control effect in the network environment.

Various embodiments of the disclosure may be identically applied to the NR communication system and the NR network besides the LTE TDD communication system as mentioned above.

In some embodiments of the disclosure, the interference control may consider changing bandwidth part (BWP). In the 5G NR communication system, the bandwidth increases and accordingly BWPs in the entire bandwidth, rather than the whole bandwidth, are operated. A plurality of (e.g., four) BWPs may be defined in the whole bandwidth. Each UE may be allocated a PRB band for the transmission and the reception in the BWP.

The management device may change the BWP, to schedule the base station of the victim cell to another frequency area in the frequency domain. The base station of the victim cell may measure the atmospheric interference per BWP allocated. In addition, the aggressor cell or the victim cell may be determined per BWP as well as per cell. If a particular BWP requires the interference avoidance, the interference may be avoided without handover, by controlling the UE to receive the signal on other BWP than the particular BWP. Likewise, the management device may change the BWP, to schedule the base station of the aggressor cell to another frequency area in the frequency domain. The management device may change the BWP for the interference mitigation of the aggressor cell. The management device may determine the aggressor cell or the victim cell per BWP. If a particular BWP requires the interference mitigation, the interference of the aggressor cell may be mitigated, by controlling the UE to transmit the signal on other BWP than the corresponding BWP.

In some embodiments of the disclosure, the interference control method may consider adjusting the symbol area of the time domain. In the NR communication system, a symbol area flexibly used for the transmission and the reception may be set per slot (or subframe). The victim cell may set the symbol area not to use the UL symbol having the interference. According to an embodiment of the disclosure, the base station of the victim cell may adaptively decrease the UL symbol area, by transmitting the DCI including a slot format indicator to the terminal. As the UL symbol area reduces, the interference may be avoided. In the same manner, the aggressor cell may set the symbol area to decrease the number of the DL symbols which cause the interference. The aggressor cell of the base station may lessen the effect of the atmospheric interference, by decreasing the number of DL symbols carrying a DL signal. In this case, the management device may transmit DL/UL allocation area information per cell, or may signal information of the area which should avoid the DL/UL allocation.

In some embodiments of the disclosure, the interference control method may change subcarrier spacing (SCS) μ. In the NR communication system, the SCS may adaptively change. If the SCS is changed, the absolute time length in one slot may change. The DL symbol duration may decrease, by increasing the DL SCS of the flexible slot, instead of reducing the number of the DL symbols of the aggressor cell. In so doing, a signal for adjusting the DL SCS may be transmitted to each cell.

An apparatus and a method according to various embodiments of the disclosure may effectively control the interference between base stations, by identifying the interference relation based on the measurement result.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the program may be stored to a memory combining part or all of those recording media. A plurality of memories may be equipped.

The program may be stored in an attachable storage device accessible via a communication network, such as Internet, Intranet, local area network (LAN), wide LAN (WLAN), or storage area network (SAN), or a communication network by combining these networks. The storage device may access the electronic device through an external port. A separate storage device may access the device over the communication network.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a device in a wireless communication system, the method comprising:
   obtaining a measurement result for each of a plurality of cells;
   identifying an aggressor cell and a victim cell by atmospheric interference among the plurality of the cells, based on the measurement result for the each of the plurality of cells;
   performing interference control on the aggressor cell for the plurality of cells, in case that a total interference amount of victim cells associated with the aggressor cell among the plurality of cells exceeds a first threshold; and
   performing interference control on the victim cell for the plurality of cells, in case that a total interference amount of aggressor cells associated with the victim cell among the plurality of cells exceeds a second threshold,
   wherein the measurement result comprises interference information related to a downlink signal of another cell measured in an uplink resource duration of a measurement cell and cell identity information of the other cell.

2. The method of claim 1,
   wherein the performing the interference control on the aggressor cell comprises changing a special subframe configuration of the aggressor cell from a first configuration to a second configuration, and
   wherein a length of a downlink pilot time slot (DwPTS) of the second configuration is shorter than a length of a DwPTS of the first configuration.

3. The method of claim 2,
   wherein the performing the interference control on the aggressor cell comprises:
   in case that a distance between the aggressor cell and the victim cell exceeds a third threshold, reducing a scheduling area of a downlink (DL) subframe of the aggressor cell, and
   wherein the scheduling area of the DL subframe comprises of a number of symbols or a number of physical resource blocks (PRBs).

4. The method of claim 1,
   wherein the performing of the interference control on the aggressor cell comprises: changing a time division duplex (TDD) DL-uplink (UL) pattern of the aggressor cell from a first pattern to a second pattern, and
   wherein a number of DL symbols of the second pattern is smaller than a number of DL symbols of the first pattern.

5. The method of claim 1,
   wherein the performing the interference control on the victim cell comprises:
   transmitting a control command to a base station of the victim cell, and
   wherein the control command controls the victim cell to perform a handover of a terminal of the victim cell to a target cell of a carrier frequency different than a carrier frequency of the victim cell.

6. The method of claim 1,
   wherein the performing the interference control on the victim cell comprises:
   transmitting a control command to a base station of the victim cell,
   wherein the control command controls the base station of the victim cell to set an additional UL carrier to a terminal of the victim cell, and
   wherein the additional UL carrier is a supplementary uplink (SUL) carrier related to the victim cell.

7. The method of claim 1,
   wherein the performing interference control on the victim cell comprises: transmitting a control command to a base station of the victim cell to change a slot format of a flexible slot from a first format to a second format,
   wherein the flexible slot is included in a TDD DL-UL pattern of the victim cell,
   wherein a number of UL symbols of the second format is smaller than a number of UL symbols of the first format, and
   wherein the control command is used by the victim cell to transmit downlink control information (DCI) for changing the slot format to a terminal.

8. The method of claim 1,
   wherein, in case that a number of victim cells corresponding to the aggressor cell among the plurality of the cells exceeds $N_1$, the interference control on the aggressor cell is performed,
   wherein, in case that a number of aggressor cells corresponding to the victim cell among the plurality of the cells exceeds $N_2$, the interference control on the victim cell is performed, and
   wherein the $N_1$ and the $N_2$ are natural numbers.

9. The method of claim 1, wherein the device is positioned at a base station which supports of the plurality of cells.

10. A device in a wireless communication system, the device comprising:
    a transceiver; and
    at least one processor coupled with the transceiver and configured to:
    obtain a measurement result for each of a plurality of cells,
    identify an aggressor cell and a victim cell by atmospheric interference among the plurality of the cells, based on the measurement result for the each of the plurality of cells,
    perform interference control on of the aggressor cell for the plurality of cells, in case that a total interference amount of victim cells associated with the aggressor cell among the plurality of cells exceeds a first threshold, and
    perform interference control on the victim cell for the plurality of cells, in case that a total interference amount of aggressor cells associated with the victim cell among the plurality of cells exceeds a second threshold,
    wherein the measurement result comprises interference information related to a downlink signal of another cell measured in an uplink resource duration of a measurement cell and cell identity information of the other cell.

11. The device of claim 10,
    wherein the processor is further configured to perform the interference control on the aggressor cell by changing a special subframe configuration of the aggressor cell from a first configuration to a second configuration, and wherein a length of a downlink pilot time slot (DwPTS) of the second configuration is shorter than a length of a DwPTS of the first configuration.

12. The device of claim 11,
wherein the processor is further configured to perform the interference control on the aggressor cell, in case that a distance between the aggressor cell and the victim cell exceeds a third threshold, by reducing a scheduling area of a downlink (DL) subframe of the aggressor cell, and
wherein the scheduling area of the DL subframe comprises of a number of symbols or a number of physical resource blocks (PRBs).

13. The device of claim 10,
wherein the at least one processor is further configured to perform the interference control on the aggressor cell, by changing a time division duplex (TDD) DL-uplink (UL) pattern of the aggressor cell from a first pattern to a second pattern, and
wherein a number of DL symbols of the second pattern is smaller than a number of DL symbols of the first pattern.

14. The device of claim 10,
wherein the at least one processor is further configured to perform the interference control on the victim cell by transmitting a control command to a base station of the victim cell, and
wherein the control command controls the victim cell to perform a handover of a terminal of the victim cell to a target cell of a carrier frequency than a carrier frequency of the victim cell.

15. The device of claim 10,
wherein the at least one processor is further configured to perform the interference control on the victim cell by transmitting a control command to a base station of the victim cell,
wherein the control command controls the base station of the victim cell to set an additional UL carrier to a terminal of the victim cell, and
wherein the additional UL carrier is a supplementary uplink (SUL) carrier related to the victim cell.

16. The device of claim 10,
wherein the at least one processor is further configured to perform the interference control on the victim cell by transmitting a control command to a base station of the victim cell to change a slot format of a flexible slot from a first format to a second format,
wherein the flexible slot is included in a TDD DL-UL pattern of the victim cell,
wherein a number of UL symbols of the second format is smaller than the number of UL symbols of the first format, and
wherein a control command is used by the victim cell to transmit downlink control information (DCI) for changing the slot format to a terminal.

17. The device of claim 10,
wherein, in case that a number of victim cells corresponding to the aggressor cell among the plurality of the cells exceeds $N_1$, the interference control on the aggressor cell is performed,
wherein, in case that a number of aggressor cells corresponding to the victim cell among the victim cells exceeds $N_2$, the interference control on the victim cell is performed, and
wherein the $N_1$ and the $N_2$ are natural numbers.

18. The device of claim 10, wherein the device is positioned at a base station which supports of the plurality of cells.

* * * * *